(12) United States Patent
Ren

(10) Patent No.: US 12,674,225 B2
(45) Date of Patent: Jul. 7, 2026

(54) GRAPHENE MATERIAL-METAL NANOCOMPOSITES AND PROCESSES OF MAKING AND USING SAME

(71) Applicant: The Research Foundation for The State University of New York, Amherst, NY (US)

(72) Inventor: Shenqiang Ren, Williamsville, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 753 days.

(21) Appl. No.: 17/272,192

(22) PCT Filed: Aug. 30, 2019

(86) PCT No.: PCT/US2019/049199
§ 371 (c)(1),
(2) Date: Feb. 26, 2021

(87) PCT Pub. No.: WO2020/047500
PCT Pub. Date: Mar. 5, 2020

(65) Prior Publication Data
US 2021/0379655 A1 Dec. 9, 2021

Related U.S. Application Data

(60) Provisional application No. 62/725,154, filed on Aug. 30, 2018.

(51) Int. Cl.
*C22C 9/00* (2006.01)
*B22F 1/054* (2022.01)
(Continued)

(52) U.S. Cl.
CPC .............. *C22C 9/00* (2013.01); *B22F 1/0547* (2022.01); *B22F 1/07* (2022.01); *B22F 1/16* (2022.01);
(Continued)

(58) Field of Classification Search
CPC .................................................. C09D 11/52
See application file for complete search history.

(56) References Cited

U.S. PATENT DOCUMENTS 6,849,109 B2 * 2/2005 Yadav ................... C01B 13/145
106/31.86
8,048,950 B2 11/2011 Prud'homme et al.
(Continued)

FOREIGN PATENT DOCUMENTS

| CN | 104801244 A | 7/2015 |
| CN | 104934108 B | 9/2015 |

(Continued)

OTHER PUBLICATIONS

Dou, L., et al., Solution-Processed Copper/Reduced-Graphene-Oxide Core/Shell Nanowire Transparent Conductors, ACS Nano, Jan. 28, 2016, vol. 10, Issue 2, pp. 2600-2606.
(Continued)

*Primary Examiner* — Robert A Vetere
(74) *Attorney, Agent, or Firm* — Hodgson Russ LLP

(57) ABSTRACT

Graphene material-metal nanocomposites having a metal core with one or more graphene material layers disposed on the metal core. The nanocomposites may be formed by contacting metal nanowires and one or more graphene material and/or graphene material precursor in a dispersion. The nanocomposites may be used for form inks for coating or printing conductive elements or as conductors in various articles of manufacture. An article of manufacture may be an electrical device or an electronic device.

10 Claims, 19 Drawing Sheets

(51) Int. Cl.

| | |
|---|---|
| *B22F 1/07* | (2022.01) |
| *B22F 1/16* | (2022.01) |
| *B82Y 30/00* | (2011.01) |
| *B82Y 40/00* | (2011.01) |
| *C09D 11/52* | (2014.01) |

(52) U.S. Cl.
  CPC ........ *C09D 11/52* (2013.01); *B22F 2301/052* (2013.01); *B22F 2301/10* (2013.01); *B22F 2302/40* (2013.01); *B22F 2304/054* (2013.01); *B82Y 30/00* (2013.01); *B82Y 40/00* (2013.01)

(56) References Cited

U.S. PATENT DOCUMENTS

| | | | |
|---|---|---|---|
| 8,563,169 B2 | 10/2013 | Liu et al. | |
| 8,835,046 B2 | 9/2014 | Liu et al. | |
| 9,530,531 B2 * | 12/2016 | Lin | B05D 1/04 |
| 2007/0050870 A1 | 3/2007 | Muller | |
| 2009/0052029 A1 | 2/2009 | Dai et al. | |
| 2011/0186775 A1 * | 8/2011 | Shah | D01F 9/12 |
| | | | 524/576 |
| 2011/0256014 A1 | 10/2011 | Hong et al. | |
| 2013/0081678 A1 | 4/2013 | Naito et al. | |
| 2013/0118775 A1 * | 5/2013 | Zeng | B82Y 30/00 |
| | | | 428/626 |
| 2014/0077161 A1 * | 3/2014 | Duan | H10D 30/47 |
| | | | 257/29 |
| 2014/0231718 A1 * | 8/2014 | Lin | H01B 1/02 |
| | | | 427/458 |
| 2014/0272172 A1 | 9/2014 | Zhamu et al. | |
| 2015/0093572 A1 | 4/2015 | Zhou et al. | |
| 2017/0369658 A1 * | 12/2017 | Kalkan | C08G 69/26 |
| 2019/0060619 A1 * | 2/2019 | Moeller | A61M 25/1029 |

FOREIGN PATENT DOCUMENTS

| | | |
|---|---|---|
| CN | 105215353 A | 1/2016 |
| CN | 105772741 A | 7/2016 |
| KR | 20150103857 A | 9/2015 |
| WO | 2017/048923 A1 | 3/2017 |

OTHER PUBLICATIONS

Huang, S., et al., High-Performance Suspended Particle Devices Based on Copper-Reduced Graphene Oxide Core Shell Nanowire Electrodes, Advanced Energy Materials, Mar. 23, 2018, vol. 8, No. 1703658, 10 pages.

Ahn, Y., et al., Copper Nanowire-Graphene Core-Shell Nanostructure for Highly Stable Transparent Conducting Electrodes, ACS Nano, Feb. 24, 2015, vol. 9, Issue 3, pp. 3125-3133.

Luechinger et al., "Graphene-stabilized copper nanoparticles as an air-stable substitute for silver and gold in low-cost ink-jet printable electronics," Nanotechnology, Sep. 26, 2018, vol. 19, No. 44.

Periasamy et al., "Synthesis of copper nanowire decorated reduced graphene oxide for electro-oxidation of methanol," Journal of Materials Chemistry A, Mar. 15, 2013, pp. 5973-5981, vol. 1, No. 19.

Wang et al., "Directed assembly of nanowires," Materials Today, May 26, 2009, pp. 34-43, vol. 12, No. 5.

* cited by examiner f

Time (s)

GRAPHENE MATERIAL-METAL NANOCOMPOSITES AND PROCESSES OF MAKING AND USING SAME

CROSS REFERENCE TO RELATED APPLICATIONS

This application claims priority to U.S. Provisional Application No. 62/725,154, filed on Aug. 30, 2018, the disclosure of which is hereby incorporated by reference.

FIELD OF THE DISCLOSURE

The disclosure generally relates to nanocomposites. More particularly the disclosure generally relates to graphene-metal nanocomposites.

BACKGROUND OF THE DISCLOSURE

With the surging demands of device miniaturization and nanomanufacturing, the size of microelectronic devices continues to decrease. This diminution aims to meet the increasing need for higher efficiency, portability and versatility. Consequently, the dimensions of metal wire (copper, aluminum, etc.) for delivering the required electrical power are being significantly reduced. The resulting high current density demands that the micro-devices have the ability to carry higher current without breakdown. Furthermore, Joule heating (Ohmic heating or resistive heating) of metal conductors builds up a large heat flux. When this is not timely dissipated, it greatly raises the temperature and resistivity of metal conductors. This further degrades the transport performance and the lifetime of microelectronics. Novel conductors with high current carrying capability (ampacity), electric and thermal conductivity are needed.

The above-mentioned challenges direct a search for a new conductor capable of carrying a large amount of electric current at the nanoscale. Such a conductor should also dissipate as much extra heat it can to maintain the temperature of the micro-device at a safe level. Furthermore, each new generation micro-device needs to surpass its predecessor without a significant increase in manufacturing cost. Additionally, the fabrication process of the new conductor has to be facile and easy to scale-up.

Recently, carbon nanotube and copper composites were reported to deliver high current-carrying capacity, as well as improved stability. However, van der Waals induced bundling of highly purified metallic carbon nanotubes significantly reduces their electrical and thermal conducting performance. This appears to be due to high junction resistance between overlapped nanotubes through the electrodepositing approach.

Based on the foregoing, there exists an ongoing and unmet need for improved conductors.

SUMMARY OF THE DISCLOSURE

The present disclosure provides graphene-metal nanocomposites and processes of making same. The present disclosure also provides uses of the graphene-metal nanocomposites.

The present disclosure provides processes of making metal graphene nanocomposites. In particular embodiments, a nanocomposite may be characterized as a product-by-process (where a nanocomposite is produced by a process of the present disclosure). In various examples, a process of making a graphene material-metal nanocomposite comprises forming a layer of graphene material and/or graphene-precursor material on at least a portion of a surface of or all of the surfaces of metal nanowires. A process may use preformed metal nanowires. A process may include in situ metal nanowire formation. A dispersion may comprise one or more additive.

A process may comprise forming an ink from one or more graphene material-metal nanocomposite (e.g., a powder formed from one or more graphene material-metal nanocomposite). An ink may be used to form a film of a graphene material-metal nanocomposite. A film may be formed using various coating or printing processes.

The present disclosure provides graphene material-metal nanocomposites. In various examples, a graphene material-metal nanocomposite is made by a process of the present disclosure. A graphene material-metal nanocomposite comprises a metal core and one or more graphene-material layer disposed on at least a portion of a surface of the metal core or all of the surfaces of the metal core. A graphene material-metal nanocomposite may have various forms. Non-limiting examples of forms of graphene-material-metal nanocomposites include wires, films, and bulk forms (e.g., pellets). A film may be a free-standing film or a film disposed on a substrate (e.g., in the case of printable electronics). A graphene material-metal nanocomposite may have one or more desirable properties. Non-limiting examples of desirable properties include an electrical conductivity, thermal conductivity, heat dissipation, breakdown current, mechanical properties (e.g., Young's modulus), and the like, and combinations thereof.

The present disclosure provides processes using graphene-metal nanocomposites of the present disclosure. In various examples, an ink of the present disclosure is used to form, e.g., by printing, a component of a device (e.g., an electrical device or an electronic device).

The present disclosure provides uses of the graphene-metal nanocomposites of the present disclosure. Articles of manufacture can comprise one or more graphene material-metal composite of the present disclosure. In various examples, an article of manufacture comprising one or more nanocomposite. The article of manufacture may comprise one or more component, which may be a passive component or components (e.g., conductor(s), wire(s), and the like, and combinations thereof) and/or an active component or components (e.g., antennas, relays, switch leads, radio frequency (RF) shields, and the like, and combinations thereof), comprising one or more graphene material-metal composite. The article of manufacture may be an electrical device. The article of manufacture may be an electronic device. An electrical device or electronic devices may comprise one or more component that comprises one or more nanocomposite.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
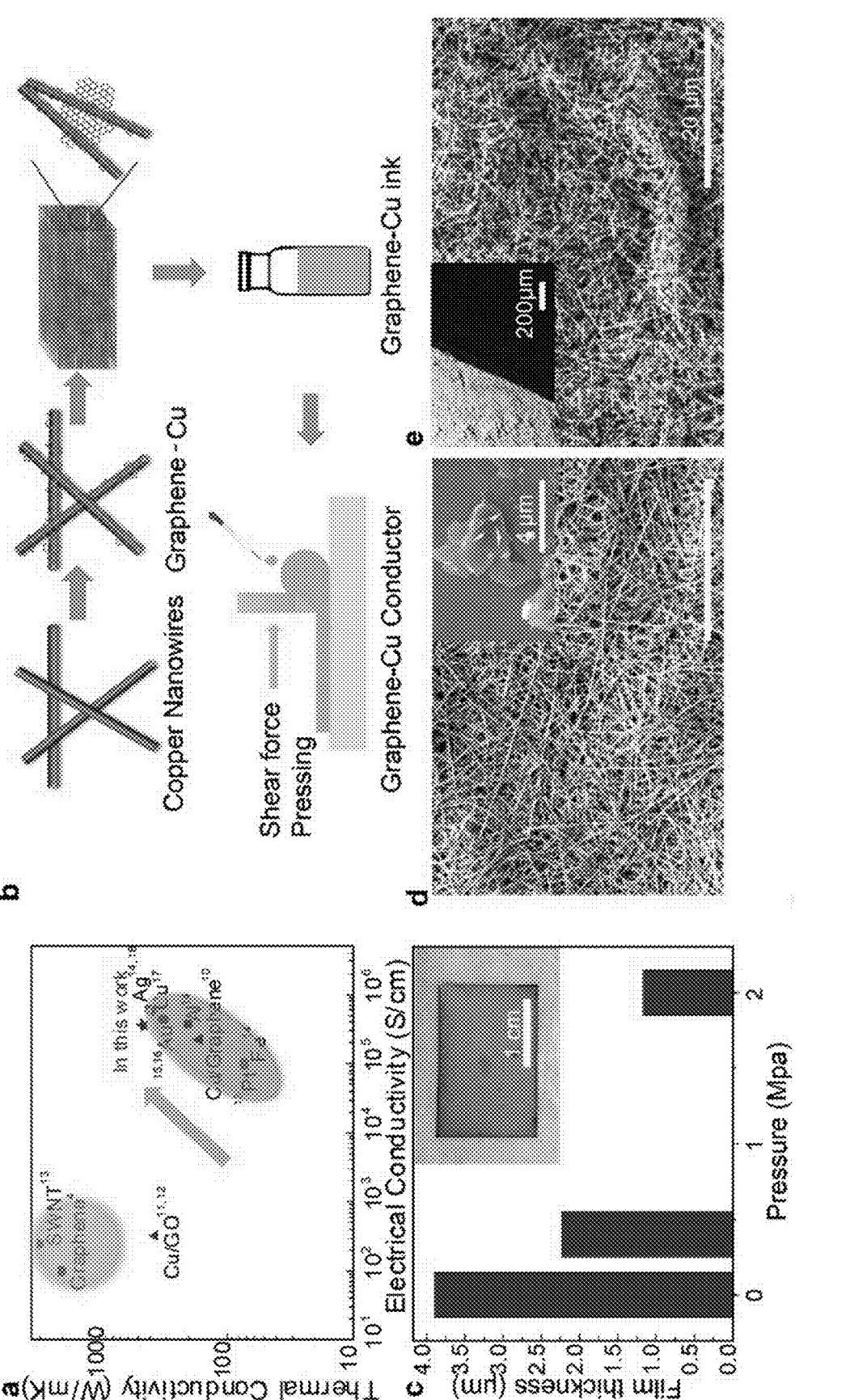
FIG. 1 shows fabrication of graphene-copper nanocomposite. (a) Plot of electrical conductivity versus thermal conductivity for various materials, including traditional metal, nanocarbons and composites. (b) Schematic representation of steps for pressed graphene-copper nanocomposite fabrication. (c) The relationship between pressure and thickness for graphene-copper films; the inset shows the as-prepared film. (d, e) Scanning electron microscopy (SEM) images of copper nanowires (Cu NWs) and graphene-copper composite, respectively. The insets show the SEM image of the graphene nanosheets and cross-section image of graphene-copper composite, respectively. (f) EDS mapping and TEM image of graphene-copper composite. (g) XRD patterns of the as-prepared Cu NWs and graphene-copper nanocomposite after calcination. (h) Load vs. displacement response of Cu NWs and graphene-copper nanocomposite. (i, j) Young's modulus mapping of Cu NWs and graphene-copper composite using XPM with a micro-force (100 μN).
Figure 1:
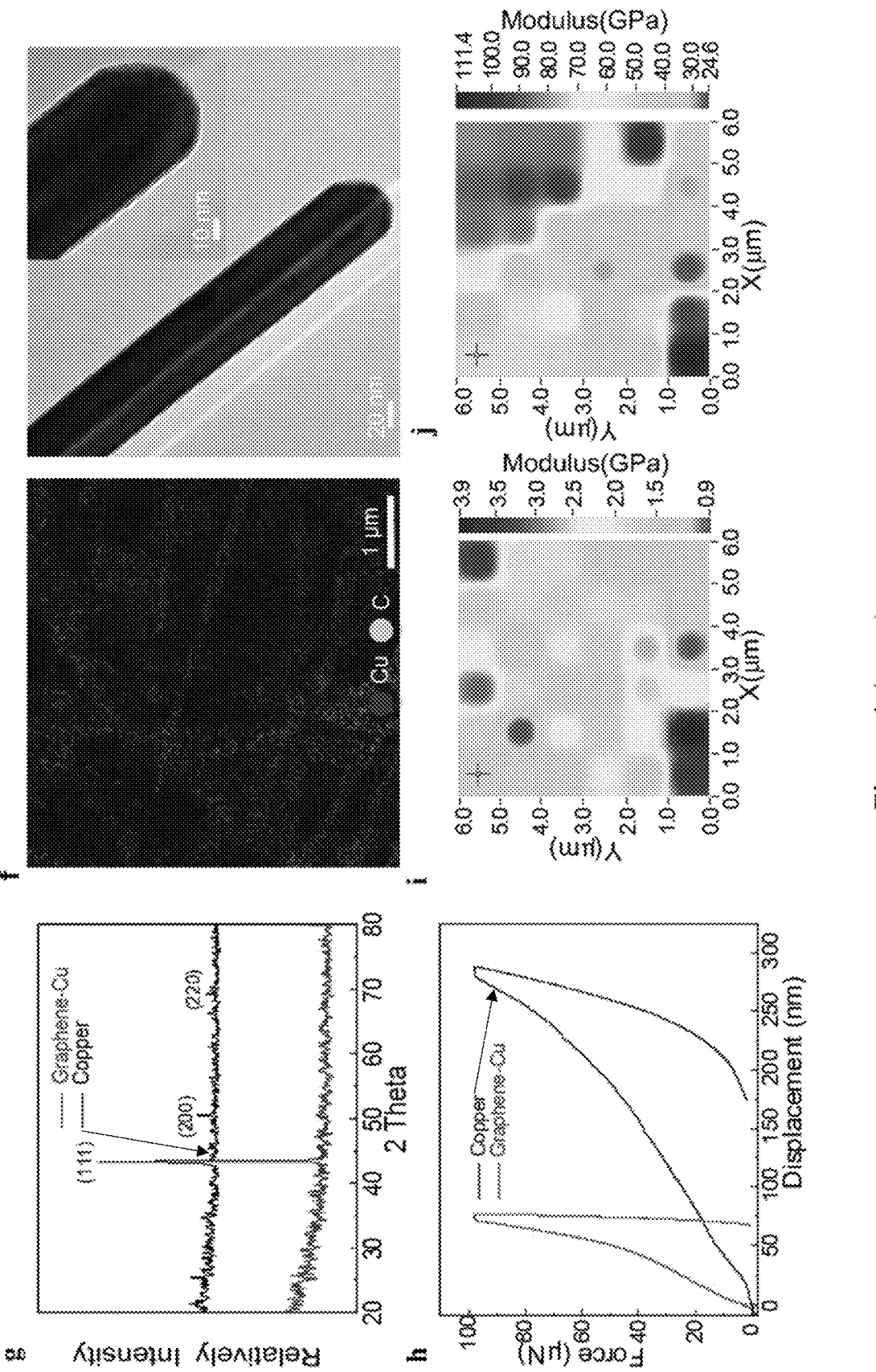

Although claimed subject matter will be described in terms of certain embodiments and examples, other embodiments and examples, including embodiments and examples that do not provide all of the benefits and features set forth herein, are also within the scope of this disclosure. Various structural, logical, and process step changes may be made without departing from the scope of the disclosure.

Every numerical range given throughout this specification includes its upper and lower values, as well as every narrower numerical range that falls within it, as if such narrower numerical ranges were all expressly written herein, and every value is included to the tenth of the value of the lower limit.

As used herein, unless otherwise indicated, the term "alkyl" refers to branched or unbranched saturated hydrocarbon groups.

As used herein, unless otherwise indicated, the term "nanowire" includes nanowires, nanorods, and combinations thereof.

The present disclosure provides graphene-metal nanocomposites and processes of making same. The present disclosure also provides uses of the graphene-metal nanocomposites.

Graphene-metal nanocomposites were developed that can be a next generation metal conductor with, for example, desirable electrical and thermal conductivity, as well as desirable current-carrying ampacity. The graphene-Cu composite conductor is superior to the traditional pure Cu conductor in several ways. The composite has, for example, better thermal conductivity, heat dissipation, breakdown current, mechanical properties, or a combination thereof, than, for example, the pure Cu (e.g., copper nanowires without graphene).

This disclosure includes, inter alia, i) scalable solution-based growth of graphene-Cu composite ink, ii) interfacial bonding between graphene and nanostructured Cu through our templated growth and molecular-level mixing process and iii) consolidation of the graphene-Cu composites through shear-assisted processing and consolidation. Without intending to be bound by any particular theory, our molecular-level organizing and interfacial bonding process enables graphene to be uniformly coated onto Cu nanostructures, creating the composite ink solution for shear-assisted film processing and consolidation.

The present disclosure provides processes of making metal graphene nanocomposites. In particular embodiments, a nanocomposite may be characterized as a product-by-process (where a nanocomposite is produced by a process of the present disclosure).

For all processes of the present disclosure, the metal may be copper, aluminum or bronze in various embodiments. In an embodiment applicable to all processes of the present disclosure, the graphene may comprise graphene nanosheets. The graphene nanosheets may be liquid exfoliated graphene nanosheets. In another embodiment for all processes of the present disclosure, the graphene may comprise reduced oxide graphene or graphene oxide.

In various examples, a process of making a graphene material-metal nanocomposite comprises forming a layer of graphene material and/or graphene-precursor material on at least a portion of a surface of or all of the surfaces of metal nanowires.

A process may use preformed metal nanowires. A metal nanowire may have a dimension (e.g., a diameter) of less than 100 nm (e.g., 40-50 nm), including all 0.1 nm values less than 100 nm, and/or a dimension (e.g., a length) of 1 μm to 1 mm, including all 0.1 μm ranges and values therebetween. Metal nanowires may be produced by processes known in the art. For example, the metal nanowires are formed by hydrothermal reduction, which may be a water-based hydrothermal reduction, of metal salts.

In the case where preformed metal nanowires are used, the forming a layer of graphene material and/or graphene-precursor material on at least a portion of a surface of or all of the surfaces of metal nanowires may comprise forming a dispersion of metal nanowires and the graphene material and/or graphene-precursor material. The dispersion may be formed using physical mixing (e.g., using sonication, such as, for example, ultrasonication).

In various examples, a process of making a graphene-metal nanocomposite comprises a) dispersing metal nanowires in solution; b) dispersing graphene in solution; c) adding the dispersion of step (a) to the dispersion of step (b) under ultrasonication to form a nanocomposite; and d) optionally, forming an ink which comprises the nanocomposite.

In certain embodiments applicable to all processes of this disclosure, one or more steps of dispersing metal nanowires and/or graphene in solution may be replaced by one or more steps of obtaining metal nanowires and/or graphene in solution.

Various metal nanowires can be used. A nanowire has at least one nanometer scale dimension. Combinations of metal nanowires can be used. Non-limiting examples of metal nanowires include copper nanowires, aluminum nanowires, copper alloy nanowires, and combinations thereof.

A process may include in situ metal nanowire formation. The metal nanowires may be formed in situ by reaction of a metal powder or a metal precursor. In the case where preformed metal nanowires are formed in situ, the forming a layer of graphene material and/or graphene-precursor material on at least a portion of a surface of or all of the surfaces of metal nanowires may comprise forming a dispersion of metal nanowires and the graphene material and/or graphene-precursor material. The dispersion may also comprise one or more reducing agent. The dispersion may be formed using physical mixing (e.g., using sonication, such as, for example, ultrasonication).

In various examples, a process of making a graphene-metal composite, which process comprises dispersing graphene and metal powder in a liquid, such as, for example, water, ethanol, toluene. In an embodiment, the graphene and the metal powder are dispersed in the liquid by ultrasonication. In an embodiment, the process further comprises collecting the composite.

Various metal powders can be used. Non-limiting examples of metal powders include copper powders, aluminum powders, copper alloy powders, and combinations thereof. Suitable metal powders are commercially available or can be made by processes known in the art.

Nanosized metal powders and micron size metal powders may be used. In a preferred embodiment, the metal powder is nanosized. In an example, a copper powder of about 4 μm in diameter is used.

Metal precursors react or decompose (e.g., thermally react or thermally decompose) to form metal nanowires. Various metal precursors can be used. Non-limiting examples of metal precursors include aluminum precursor powders, a copper precursor powders, and optionally, one or more powders chosen from nickel precursor powders, manganese precursor powders, zinc precursor powders, and combinations thereof. The metal precursors may be metal salts. Non-limiting examples of metal salts (e.g., aluminum, copper, nickel, manganese, or zinc salts) include metal chlorides, metal nitrates, metal sulfates, and combinations thereof. Suitable metal precursors are known in the art and are commercially available or can be made by processes known in the art.

A dispersion may comprise one or more additive. Without intending to be bound by any particular theory, it is considered that the additive improves the interaction between the metal core and graphene material and/or improves the flowability and/or viscosity of a dispersion, which may be used as an ink, for example, an ink for printing. Generally, one or more additive is used when the graphene material nanocomposite is used to form an ink. Non-limiting examples of additives include water-soluble primary amines (e.g., alkylamines, such as, for example, $C_{10}$-$C_{20}$ alkyl amines (hexadecylamines)). An additive or additives may be present in a dispersion at 1 to 10 wt. % based on the total weight of the dispersion.

Various amounts of metal nanowires, metal precursors, and graphene materials may be used. In various examples, the metal nanowires and/or metal precursors are present at 95 to 99 wt. % in the dispersion (based on the total weight of metal nanowires or metal precursors and graphene material and/or graphene-precursor material), including all 0.1 wt. % values and ranges therebetween, and/or the graphene material or graphene-precursor material is present 1 to 5 wt. % in the dispersion (based on the total weight of metal nanowires and/or metal precursors and graphene material and/or graphene-precursor material), including all 0.1 wt. % values and ranges therebetween.

Various ratios of metal nanowire and/or metal precursor weight to the graphene material and/or graphene-precursor material can be used. In various examples, the ratio of the metal nanowire weight to the graphene material and/or graphene-precursor material weight is 95:5 to 99:1, including all 0.1 ratio values and ranges therebetween.

Various graphene materials may be used. Combinations of graphene materials may be used. Non-limiting examples of graphene materials include graphene, reduced graphene, graphene oxide, and combinations thereof. The graphene materials may be exfoliated sheets. Non-limiting examples of exfoliated sheet graphene materials include exfoliated graphene sheets, exfoliated reduced graphene sheets, exfoliated graphene oxide sheets, and combinations thereof. Suitable graphene materials are known in the art and are commercially available or can be made by processes known in the art.

Graphene-material precursors react or decompose (e.g., thermally react or thermally decompose) to form a graphene material. Various graphene material precursors may be used. Combinations of graphene material precursors may be used. A graphene-material precursor may be an organic small molecule. Non-limiting examples of graphene-material precursors include dopamine, aniline, and the like, and combinations thereof.

Various reducing agents may be used. Non-limiting examples of reducing agents include carbohydrates (such as, for example, sugars) and combinations thereof. In an example, the reducing agent is glucose (e.g., D-glucose). The amount of reducing agent is sufficient to reduce the metal precursor(s) and form metal nanowires.

Various liquids, which may be referred to as dispersants or solvents, can be used to form a dispersion of metal nanowires and/or graphene materials. In various examples, the liquid is water, an organic liquid, such as, for example, a $C_1$ to $C_6$ alcohol (e.g., ethanol), or a combination thereof.

A dispersion can comprise various amounts of liquids. In various examples, a dispersion comprises 5 to 20 wt. % of a liquid based on the weight of metal nanowires and/or metal precursors and/or graphene materials and/or graphene precursor materials. It is desirable to use an amount of liquid that forms a dispersion or slurry of the metal nanowires and/or metal precursors and/or graphene materials and/or graphene precursor materials.

A graphene material-metal nanocomposite may be isolated from the dispersion of graphene materials and metal nanowires. Examples of suitable isolation processes are known in the art. In a variety of embodiments of all processes of this disclosure, e.g., step (c), may further comprise collecting the nanocomposite.

A process may comprise forming an ink from one or more graphene material-metal nanocomposite (e.g., a powder formed from one or more graphene material-metal nanocomposite). In various examples, the dispersion of as formed graphene material-metal nanocomposite is an ink. In various embodiments of all processes of this disclosure, the ink may be formed by dispersing the nanocomposite(s) (which individually may have been collected) in a liquid, such as toluene.

In various examples, a process of making a graphene-metal nanocomposite, which process comprises: a) dispersing metal nanowires in solution; b) dispersing graphene in solution;
c) adding the dispersion of step (a) to the dispersion of step (b) under ultrasonication to form a nanocomposite; d) forming an ink which comprises the nanocomposite; e) forming a film from the ink; and f) optionally, calcining the film.

One or more graphene material-nanocomposite can be deployed in ink form. The ink can be utilized, e.g., for microelectronic fabrication. For example, it can be used to 3D print circuit boards, other electric circuits or electrodes. The present disclosure encompasses all products made by 3D printing using the inventive ink.

An ink may be used to form a film of a graphene material-metal nanocomposite. A film may be formed using various coating or printing processes. The film may be formed, for example, by coating (e.g., drop casting, dip casting, dip coating, spray coating, spin coating, and the like), printing (e.g., inkjet printing, screen printing, and the like), additive manufacturing (e.g., direct writing-based additive manufacturing and the like), and the like. In various examples, a process further comprises forming a film from an ink comprising one or more graphene material-metal nanocomposite.

The metal nanowires in the graphene-material nanocomposite (e.g., in a wire, film, or pellet) may be aligned. By "aligned" it is meant that a portion of the individual metal cores in an aligned graphene-material nanocomposite are aligned parallel with a longest dimension of the aligned graphene-material nanocomposite. In various example, 60% or more, 70% or more, or 80% or more of a dimension of the individual metal cores in an aligned graphene-material nanocomposite are within 5 degrees or less, 2 degrees or less, or 1 degree or less of a dimension of the an aligned graphene-material nanocomposite. Optionally, a process, e.g., step (e), may further comprising aligning the nanowires in liquid form (e.g., by liquid flow).

Additionally or alternatively, a process, e.g., step (e), may optionally further comprise applying a shear force to the film. Any shear force may be used, such as rolling, sliding (horizontal) or vertical shear force. In an embodiment, the shear force may be applied at room temperature. In another embodiment, the shear force may be hot pressing. In an embodiment, the hot pressing is conducted at a temperature from about 300 to about 1000° C.

In various embodiments, the shear force may range from about 3500 to about 7000 kPa and all ranges and integers therebetween. In some embodiments, the shear force may be applied for 5 minutes to 30 minutes and all ranges and integers therebetween. Without intending to be bound by any particular theory, the shear force may be used to align the nanowires, as well as to compact them.

In an embodiment, the process further comprises applying shear force to the composite (which may have been collected).

In a preferred embodiment, the shear force comprises hot pressing. In an embodiment, the hot pressing is conducted at a temperature from about 300 to about 1000° C. In another embodiment, the shear force may be applied at room temperature. Any shear force may be used, such as rolling, sliding (horizontal) or vertical shear force.

In various embodiments, the shear force may range from about 3500 to about 7000 kPa and all ranges and integers therebetween. In some embodiments, the shear force may be applied for 5 minutes to 30 minutes and all ranges and integers therebetween.

In certain embodiments, the application of shear force may be followed by extrusion. In an embodiment, the extrusion is performed at room temperature. In a preferred embodiment, the extrusion is Shear Assisted Processing and Extrusion (ShAPE). In another embodiment, the extrusion is Equal Channel Angular Extrusion (ECAE). In a preferred embodiment, the extrusion follows hot pressing of the composite collected after ultrasonic dispersion of graphene and metal powder in a liquid. Extrusion may be used to make, e.g., wires or cables. Wires may be used, for instance, for winding metals for motors. Wires, cables, etc. made with the inventive nanocomposites are within the scope of the disclosure.

A graphene material-metal nanocomposite or a combination of graphene material-metal nanocomposites may be used to form a pellet. A pellet may be formed by compression of one or more graphene material-metal nanocomposites, which may be in powder form. In various examples, a pellet is formed by compressing one or more graphene material-metal nanocomposites, which may be in powder form and/or in a mold, under hydrostatic pressure (e.g., 20 Ton). A process may comprise forming a pellet of a graphene material-metal nanocomposite or a combination of graphene material-metal nanocomposites.

A graphene material-metal nanocomposite or a combination of graphene material-metal nanocomposites may be used to form wire. A wire may be formed from (comprise) a plurality of individual wires. A process may comprise forming a wire from a pellet formed from a graphene material-metal nanocomposite or a combination of graphene material-metal nanocomposites. In various examples, a wire is formed by extrusion of one or more pellets. Suitable extrusion processes are known in the art.

The graphene material metal nanocomposite may be calcined. In an embodiment, the calcining may be performed at a temperature of about 625 to about 1110 K. In an embodiment, the calcining may be conducted for a duration of about 30 minutes to about 2 hours. In a particular embodiment, the calcining may be conducted under any inert gas such as Ar or 5% Hz balanced by $N_2$.

The present disclosure provides graphene material-metal nanocomposites. In various examples, a graphene material-metal nanocomposite is made by a process of the present disclosure. In various examples, a graphene-metal nanocomposite has one or more improved properties compared to the pure metal (e.g., the metal nanowires without one or more graphene material layer.

A graphene material-metal nanocomposite comprises a metal core and one or more graphene-material layer disposed on at least a portion of a surface of the metal core. The layer(s) is/are at least partially continuous or completely continuous. In an example, the one or more graphene material layer is not grown (e.g., by processes such as chemical vapor deposition, atomic layer deposition, and the like) on a metal core.

A layer can have various thicknesses. An individual layer may have a consistent thickness or a thickness that varies in individual regions of the layer. A graphene material layer may be a shell. The shell is at least partially continuous or completely continuous. A graphene material layer may comprises 1 to 2 layers of graphene or have a thickness of 2 nm or less.

Various metal cores can be used. A metal core may be a metal nanowire. A metal core may have a dimension (e.g., a diameter) of less than 100 nm (e.g., 40-50 nm), including all 0.1 nm values less than 100 nm, and/or a dimension (e.g., a length) of 1 μm to 1 mm, including all 0.1 μm ranges and values therebetween. Combinations of metal cores may be used. Non-limiting examples of metal cores include cores comprising copper, aluminum, a copper alloy (e.g., bronze, a copper-nickel alloy, and the like), or a combination thereof. In an example, a copper-nickel alloy comprises 2-12 wt. % nickel (based on the total weight of the alloy), including all 0.1 wt. % values and ranges therebetween.

Various graphene materials can be used. Combinations of graphene materials can be used. Non-limiting examples of graphene materials include graphene, reduced graphene, graphene oxide, and combinations thereof.

A graphene material-metal nanocomposite may have various forms. Non-limiting examples of forms of graphene-material-metal nanocomposites include wires, films, and bulk forms (e.g., pellets). A film may be a free-standing film or a film disposed on a substrate (e.g., in the case of printable electronics). In various examples, a wire has a dimension perpendicular to the long axis of the wire (e.g., a diameter) of 1 micron to 1 cm (e.g., 1 to 10 microns and 1 micron to 10 mm, and 100 microns to 1 cm), including all 1 micron values and ranges therebetween. In various examples, a film has a dimension perpendicular to the longest dimension of the film (e.g., a thickness) of 100 nm to 100 microns (e.g., 100 nm to 50 microns), including all 1 nm values and ranges therebetween. A wire may comprise multiple wires.

A graphene material-metal nanocomposite may have one or more desirable properties. Non-limiting examples of desirable properties include an electrical conductivity, thermal conductivity, heat dissipation, breakdown current, mechanical properties (e.g., Young's modulus), and the like, and combinations thereof. In various examples, the graphene-material nanocomposite exhibits an electrical conductivity of $4 \times 10^6$ to $5.5 \times 10^6$ S/cm, a breakdown current that is at least 10 times, 25 times, 50 times, 75 times, or 100 times that of the metal nanowires (without a graphene material layer), a Young's modulus of at least 2 times or 5 times that of the metal nanowires (without a graphene material layer), or a combination thereof. In various examples, the conductivity of the nanocomposite decreases by 10% or less or 5% or less at a temperature of 150° C.

The present disclosure provides processes using graphene-metal nanocomposites of the present disclosure. In various examples, an ink of the present disclosure is used to form, e.g., by printing, a component of a device (e.g., an electrical device or an electronic device).

In an example, a process of forming a conductive element of an electronic device comprises forming a conductive element of an electronic device using an ink of the present disclosure; and contacting the element of the electronic device with an aqueous organic acid solution or an organic solvent acid solution. Without intending to be bound by any particular theory, it is considered that the aqueous acid solution or the organic solvent acid solution removes at least a portion or all of one or more insulating material, which may be additives. The conductive element of an electronic device may be formed by a printing method described herein.

Various aqueous organic acid solutions can be used. An aqueous organic acid solution comprises water and one or more organic acid. Non-limiting examples of organic acids include alkylcarboxylic acids (e.g., $C_1$-$C_5$ alkylcarboxlic acid, such as, for example, acetic acid, and the like).

Various organic solvent acid solutions can be used. An organic solvent acid solution comprises one or more alcohol and one or more organic acid. Non-limiting examples of alcohols include $C_1$-$C_5$ alcohols (e.g., ethanol, and the like, and combinations thereof). Non-limiting examples of organic acids include alkylcarboxylic acids (e.g., a $C_6$-$C_{15}$ alkylcarboxlic acid, such as, for example, dodecanoic acid, and the like).

The present disclosure provides uses of the graphene-metal nanocomposites of the present disclosure. Articles of manufacture can comprise one or more graphene material-metal composite of the present disclosure.

In various examples, an article of manufacture comprising one or more nanocomposite. The article of manufacture may comprise one or more component, which may be a passive component or components (e.g., conductor(s), wire(s), and the like, and combinations thereof) and/or an active component or components (e.g., antennas, relays, switch leads, RF shields, and the like, and combinations thereof), comprising one or more graphene material-metal composite.

The article of manufacture may be an electrical device. Non-limiting examples of electrical devices include electrical motors, electrical generators, transformers, switching regulators, converters, inverters, charging circuits, discharge circuits, PCL control devices, transmission and distribution units (which may be high-voltage transmission or distribution units), circuit breakers, and the like.

The article of manufacture may be an electronic device. Non-limiting examples of electronic devices include consumer electronic devices (e.g., computer, cellular phone, and the like), home appliance devices (e.g., television, washers, dryers, and the like), solar cells, sensor devices (e.g., wireless sensor devices), control devices, amplifiers, attenuators, Internet of Things (IOT) devices, audio devices, RFID devices, illuminating devices, and the like.

An electrical device or electronic devices may comprise one or more component that comprises one or more nanocomposite. Non-limiting examples of components include antennas, contacts, conductors, relays, switch leads, RF shields, and the like.

The steps of the processes described in the various embodiments and examples disclosed herein are sufficient to carry out the processes of the present disclosure. Thus, in an embodiment, a process consists essentially of a combination of the steps of the processes disclosed herein. In another embodiment, a process consists of such steps.

The following Statements described various non-limiting examples of graphene material-composites of the present disclosure, processes of making same, and uses of same:

Statement 1. A process of making a graphene material-metal nanocomposite of the present disclosure (e.g., a process comprising forming a layer of graphene material and/or graphene-precursor material on at least a portion of a surface of or all of the surfaces of metal nanowires; and optionally, calcining the metal nanowires comprising a layer of graphene-precursor material, where the graphene material-metal nanocomposite is formed).

Statement 2. The process according to Statement 1, where the forming a layer of graphene material and/or graphene-precursor material on at least a portion of a surface of or all of the surfaces of metal nanowires comprises forming a dispersion of metal nanowires and the graphene material and/or graphene-precursor material.

Statement 3. The process according to Statement 2, where the forming a dispersion of metal nanowires and the graphene material and/or graphene-precursor material comprises dispersing metal nanowires in a dispersant; dispersing graphene material or graphene-precursor material in a dispersant, and adding the metal nanowire dispersion to the graphene material or graphene-precursor material dispersion.

Statement 4. The process according to Statement 2 or 3, where the metal nanowires are present at 95 to 99 wt. % (based on the total weight of metal nanowires and graphene material and/or graphene-precursor material) in the dispersion.

Statement 5. The process according to any one of Statements 2-4, where the graphene material or graphene-precursor material is present 1 to 5 wt. % (based on the total weight of metal nanowires and graphene material and/or graphene-precursor material) in the dispersion.

Statement 6. The process according to any one of Statements 2-5, where the dispersant of the dispersion is water, a $C_1$ to $C_6$ alcohol, or a combination thereof.

Statement 7. The process according to any one of Statements 2-6, where the ratio of the metal nanowire weight to the graphene material and/or graphene-precursor material weight is 95:5 to 99:1.

Statement 8. The process according to any one of Statements 2-7, where the metal nanowires are chosen from copper nanowires, aluminum nanowires, copper alloy wires, and combinations thereof.

Statement 9. The process according to any one of the preceding Statements, where the forming a layer of graphene material and/or graphene-precursor material on at least a portion of a surface of or all of the surfaces of metal nanowires comprises: forming a dispersion of a metal powder or a metal precursor and a graphene material and/or graphene-precursor material.

Statement 10. The process according to Statement 9, where the forming the dispersion comprises dispersing the metal powder or the metal precursor in a dispersant, and dispersing the graphene material and/or graphene-precursor material in a dispersant.

Statement 11. The process according to Statements 9 or 10, where the dispersion further comprises one or more water-soluble primary amine.

Statement 12. The process according to any one of Statements 9-11, where the metal powder is a nanopowder.

Statement 13. The process according to any one of Statements 9-12, where the metal powder is copper powder, aluminum powder, a copper alloy powder, or a combination thereof.

Statement 14. The process according to any one of Statements 9-13, where the metal precursor is an aluminum precursor powder or a copper precursor powder, and optionally, one or more powders are chosen from nickel precursor powders, manganese precursor powders, zinc precursor powders, and combinations thereof.

Statement 15. The process according to any one of Statements 9-15, where the metal powder or metal precursor is present 95 to 99 wt. % (based on the total weight of metal powder or a metal precursor and graphene material) in the dispersion.

Statement 16. The process according to any one of Statements 9-15, where the graphene material is present 1 to 5 wt. % (based on the total weight of metal powder or a metal precursor and graphene material) in the dispersion.

Statement 17. The process according to any one of Statements 9-16, where the ratio of metal powder or metal precursor weight to graphene material weight is 95:5 to 99:1.

Statement 18. The process according to any one of Statements 9-17, where the dispersant is water, a $C_1$ to $C_6$ alcohol, or a combination thereof.

Statement 19. The process according to any one of the preceding Statements, further comprising isolating the nanocomposite from the dispersion.

Statement 20. The process according to any one of the preceding Statements, where the graphene material is graphene, reduced graphene, graphene oxide, or a combination thereof.

Statement 21. The process according to any one of the preceding Statements, where the graphene material is exfoliated graphene sheets, exfoliated reduced graphene sheets, or exfoliated graphene oxide sheets.

Statement 22. The process according to any one of the preceding Statements, where the graphene-precursor material is a small molecule.

Statement 23. The process according to any one of the preceding Statements, further comprising forming an ink comprising the nanocomposite.

Statement 24. The process according to Statement 23, further comprising forming a film using the ink.

Statement 25. The process according to Statement 24, where the film is formed by coating, printing, or additive manufacturing.

Statement 26. The process according to any one of the preceding Statements, further comprising aligning the metal nanowires.

Statement 27. The process according to Statement 26, where the aligning comprises applying a shear force to the film.

Statement 28. The process according to Statement 27, where the shear force is 3500 to 7000 kPa.

Statement 29. The process according to any one of the preceding Statements, further comprising calcining the nanocomposite.

Statement 30. The process according to any one of Statements 20-29, where the calcining is performed out at a temperature of 625 to 1110 K.

Statement 31. The process according to any one of the preceding Statements, further comprising forming a pellet comprising the nanocomposite.

Statement 32. The process according to Statement 31, further comprising forming a wire from the pellet.

Statement 33. The process according to Statement 32, where the forming the wire comprises extruding the pellet.

Statement 34. A nanocomposite of the present disclosure (e.g., a nanocomposite comprising a metal core and a graphene material layer disposed on at least a portion of a surface of the metal core or all of the surfaces of the metal core), which may be made by a process of the present disclosure (e.g., a process of any one of Statements 1-33).

Statement 35. The nanocomposite according to Statement 34, where the metal core comprises copper, aluminum, a copper alloy, or a combination thereof.

Statement 36. The nanocomposite according to Statements 34 or 35, where the graphene material is graphene, reduced graphene, graphene oxide, or a combination thereof.

Statement 37. The nanocomposite according to any one of Statements 34-36, where the graphene-material layer comprises 1 to 2 layers of graphene material.

Statement 38. The nanocomposite according to any one of Statements 34-37, where the graphene-material layer has a thickness of 2 nm or less.

Statement 39. The nanocomposite according to any one of Statements 34-38, where the graphene-material layer is at least partially continuous or completely continuous.

Statement 40. The nanocomposite according to any one of Statements 34-39, where the graphene-material layer is a shell and the shell is at least partially continuous or completely continuous.

Statement 41. The nanocomposite according to any one of Statements 34-40, where the nanocomposite is a wire, a film, or a pellet.

Statement 42. The nanocomposite according to any one of Statements 34-41, where the nanocomposite exhibits one or more of the following: an electrical conductivity of $4 \times 10^6$ to $5.5 \times 10^6$ S/cm; a breakdown current that is at least 10 times, 25 times, 50 times, 75 times, or 100 times that of the metal nanowires (without a graphene material layer); or a Young's modulus of at least 2 times or 5 times that of the metal nanowires (without a graphene material layer).

Statement 43. A process of forming a conductive element of an article of manufacture of the present disclosure (e.g., an electrical device or an electronic device of the present disclosure) (e.g., a process comprising forming a conductive element of an electronic device using an ink comprising one or more nanocomposite of the present disclosure (e.g., one or more nanocomposite according to any one of Statements 34-42); and contacting the element of the electronic device with an aqueous organic acid solution or an organic solvent acid solution).

Statement 44. The process according to Statement 43, where the aqueous organic acid solution comprises an organic acid and water.

Statement 45. The process according to Statements 43 or 44, where the organic solvent acid solution comprises an organic acid and a $C_1$-$C_5$ alcohol.

Statement 46. An article of manufacture of the present disclosure (e.g., an article of manufacture comprising one or more nanocomposite of the present disclosure (e.g., one or more nanocomposite according to any one of Statements 34-42)).

Statement 47. The article of manufacture according to Statement 46, where the article of manufacture is an electrical device.

Statement 48. The article of manufacture according to Statements 46 or 47, where the electrical device is an electrical motor, an electrical generator, a transformer, a switching regulator, converters, inverters, charging circuits, discharge circuits, a PCL control device, transmission units, distribution units, a battery device, or a battery power management device.

Statement 49. The article of manufacture according to any one of Statements 46-48, where the article of manufacture is an electronic device.

Statement 50. The article of manufacture according to Statement 49, where the electronic device is a consumer electronic device a consumer electronic device, or a home appliance device, a solar cell, a wireless sensor device, a control device, an amplifiers, an attenuators, an Internet of Things (IOT) devices, a battery device, a battery charging device, a battery power management device, an audio device, an RFID device, or an illuminating device.

Statement 51. The article of manufacture according to any one of Statements 46-50, where one or more component of an electrical device or electronic devices comprises the one or more nanocomposite.

Statement 52. The article of manufacture according to Statement 51, where the component is an antenna, contact, a conductor, a relay, a switch lead, or a radio frequency (RF) shield.

The following examples are presented to illustrate the present disclosure. They are not intended to be limiting in any matter.

EXAMPLE 1

This example provides a description of metal nanocomposites of the present disclosure, processes of making same, and characterization of same.

We fabricated a graphene and copper composite with a clean interface between the two constituents so that they were synergistically integrated (FIG. 1b). It combines the unique characteristics of graphene (high thermal conductivity and current carrying) and copper (high electrical conductivity). Graphene, being an allotrope of carbon, is friendly to the environment. It exhibits a phonon-induced thermal conductivity of 2,000-4,000 W m$^{-1}$K$^{-1}$ and demonstrates a high current carrying ampacity of $10^8$ A cm$^{-2}$. Its ampacity is 100 times higher than that of traditional metal conductors (such as Cu~$10^6$ A cm$^{-2}$). Graphene alone cannot replace a metal conductor in an electrical circuit due to its limited free electron density. Graphene holds a large mean free path of up to 28 µm at room temperature, which is about 700 times of that of copper. Copper has a relatively small mean free path (~0.04 µm at RT) and electron induced thermal conductivity. This contributes to the much lower thermal conductivity relative to graphene. Yet, copper possesses high electrical conductivity and fairly good ductility. We integrated phonon-dominated graphene and electron-dominated copper to create a conductive high-current-carrying metal composite with better thermal management. FIG. 1a shows the electrical and thermal conductivity of metals and nanocarbon materials.

Our scalable graphene-copper conductors (graphene-Cu, FIG. 1a) exhibited high electrical and thermal conductivity and high current carrying capability (ampacity) over a broad temperature range. Our solution-processed graphene-Cu composite displayed a conductivity of $3.1\times10^5$ S cm$^{-1}$ at 363 K ($3.67\times10^5$ S cm$^{-1}$ at 293 K) and a breakdown current of 1.06 A$^2$. These properties were 63% and 39%, respectively, higher than those of the pure Cu. Furthermore, the first-principle based simulation of the carrier transport behavior of graphene-Cu composites showed that the density of states of the surface copper atoms at the Fermi level was effectively increased. The interaction between electrons and phonons was effectively reduced in the graphene-Cu composite system. Without intending to be bound by any particular theory, we believe that this mechanism improved the thermal conductivity of the composite conductor with respect to traditional ones, such as Cu. The graphene percolation networks efficiently decrease the electron-phonon coupling in the copper-graphene composites even if phonon modes are activated at a high temperature. The composite film exhibited high density and preferred Cu nanowire alignment, along with a controlled film thickness films (1.2 µm~4.1 µm, FIG. 1c) that depends on the concentration of the ink and the pressure applied.

Figure 8:
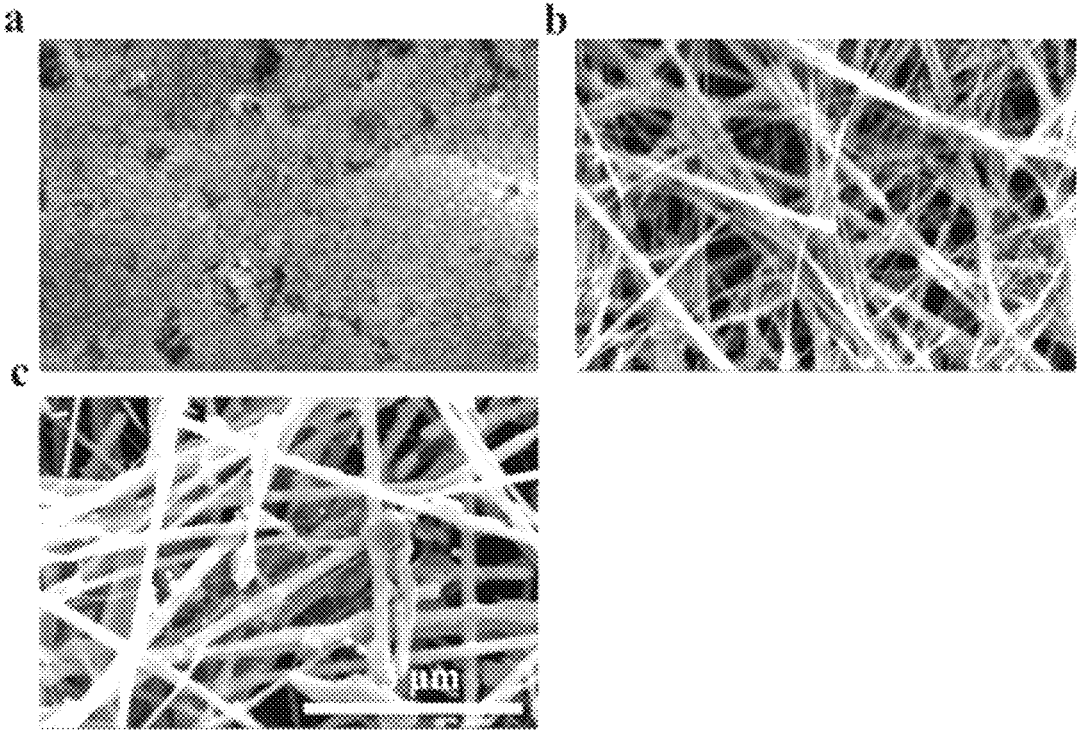
FIG. 8 shows the role of reducing agent (tris(trimethylsily)silane) and reaction time in copper sample morphology control. SEM images of copper samples reacted with various reducing agent and time synthesized under 185° C.: (a) Copper nanoparticles, 0.62 mL/8 h; (b) Copper nanoparticle mixed with nanowires, 0.65 mL/10 h (h=hour(s)); (c) Copper nanowires became the major part in the final product, 0.68 mL/12 h.
Figure 9:
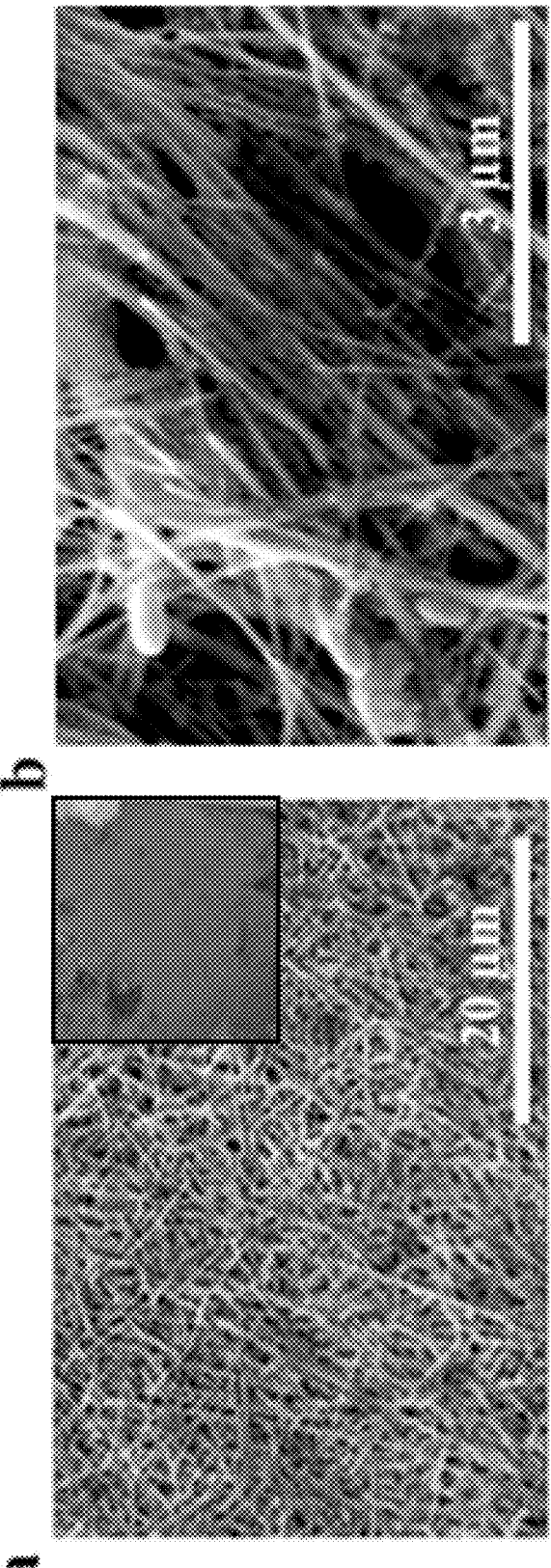
FIG. 9 shows (a) low and (b) high SEM images of as-synthesized ink formed a film at the interface of water/air without further protection, inset is the picture of as-synthesized film. A typical copper red (in black box in (a)) can still be seen in this picture, indicating that the as-synthesized sample has a good film forming characteristics and also is stable even in water.

The graphene-copper metal conductor was grown through a scalable and versatile solution processing. The fabrication procedure started by creating liquid-phase exfoliated graphene nanosheets. The graphene sheets were then mixed with Cu nanowires to create a dense graphene-Cu solution ink facilitated by ultrasonic-wrapping process. During the ultrasonication process, the ligands on the surface of Cu nanowires were dispersed in the nonpolar solvent. They subsequently facilitated wrapping the graphene nanosheets onto Cu nanowire, thus forming the core-shell type nanostructure. The morphology of Cu nanowires was controlled by the amount of reducing agent and the reaction times (FIG. 8). The as-synthesized ink formed an air-stable film at the water/air interface (FIG. 9).

Structure. Without intending to be bound by any particular theory, FIGS. 1d and 1e support our hypothesis that the thin sheets of graphene (inset of FIG. 1d) were wrapped around the copper nanowires. These figures show the differences in the scanning electron microscopy (SEM) images of the copper nanowires, before and after being mixed with graphene. This result was further confirmed in the transmission electron microscope (TEM) images, in which a clear interface was shown between two materials. These images also show a thin coating (~2 nm) on the surface of Cu NWs (FIG. 1f). The energy dispersive X-ray spectroscopy (EDS) mapping (FIG. 1f) of the obtained composite confirmed that the shell was composed of carbon, implying the presence of graphene. The X-ray diffraction (XRD) patterns confirmed the formation of graphene-Cu (111) composite and pure Cu after calcination (FIG. 1g).

Properties. The mechanical properties (Young's modulus and hardness) of the graphene-Cu nanocomposites are important for robust technological applications. The Young's modulus (~1 TPa) of graphene strengthened the composite. Nanoindentations of the graphene-Cu film showed that Young's modulus of the composite was approximately 55.40 GPa across the film. This was much higher than that of as-grown Cu (1.33 GPa, FIG. 1h). The nanoindentation mapping across the film verified a uniform and remarkable increase in Young's modulus across the graphene-Cu composite film (FIG. 1i-1j, Cu and graphene-Cu, respectively). The composite was also strengthened by graphene's superior tensile strength (~130 GPa).

Figure 2:
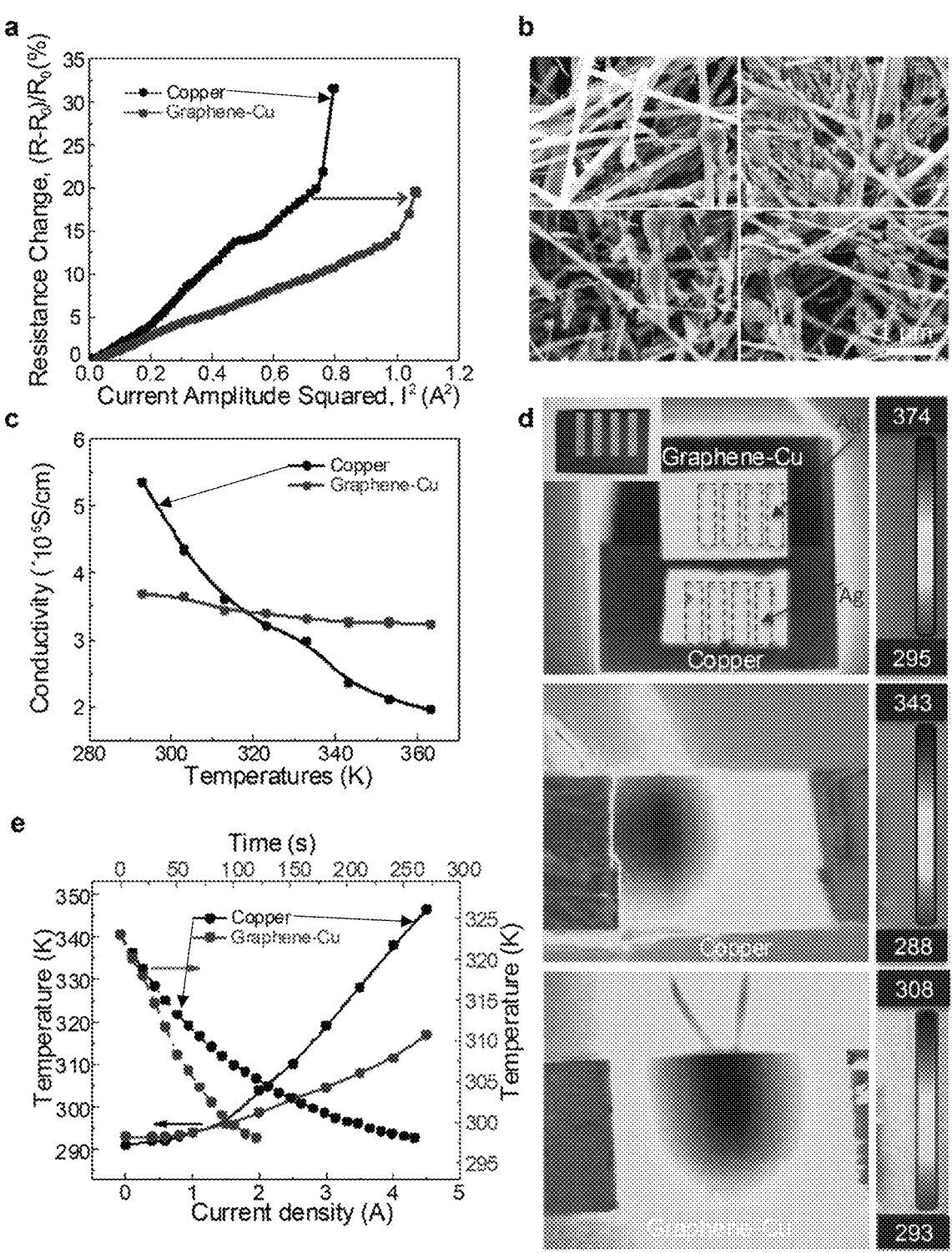
FIG. 2 shows electrical and thermal conductivities of graphene-copper composite. (a) Breakdown characteristics of Cu NWs and graphene-copper composite, showing the relative change of resistance plotted as a function of square of the current (I2). (b) SEM images of Cu NWs (upper) and graphene-copper composite (lower) before and after measurement. (c) Variation of electrical conductivity with temperature for copper nanowires and graphene-copper composite, showing the temperature-insensitive characteristics of graphene-copper composite. (d) Thermal images of Cu NWs and graphene-copper composite simultaneously heated on a hotplate at 363 K (upper image); thermal image of Cu NWs (middle image) and graphene-copper composite (lower image) operated at a high current density of 4 A, showing that the composite has a lower temperature due to the fast phonon transmission rate from graphene. (e) The current density and time dependent temperature change of Cu NWs and graphene-copper composite.
Figure 10:
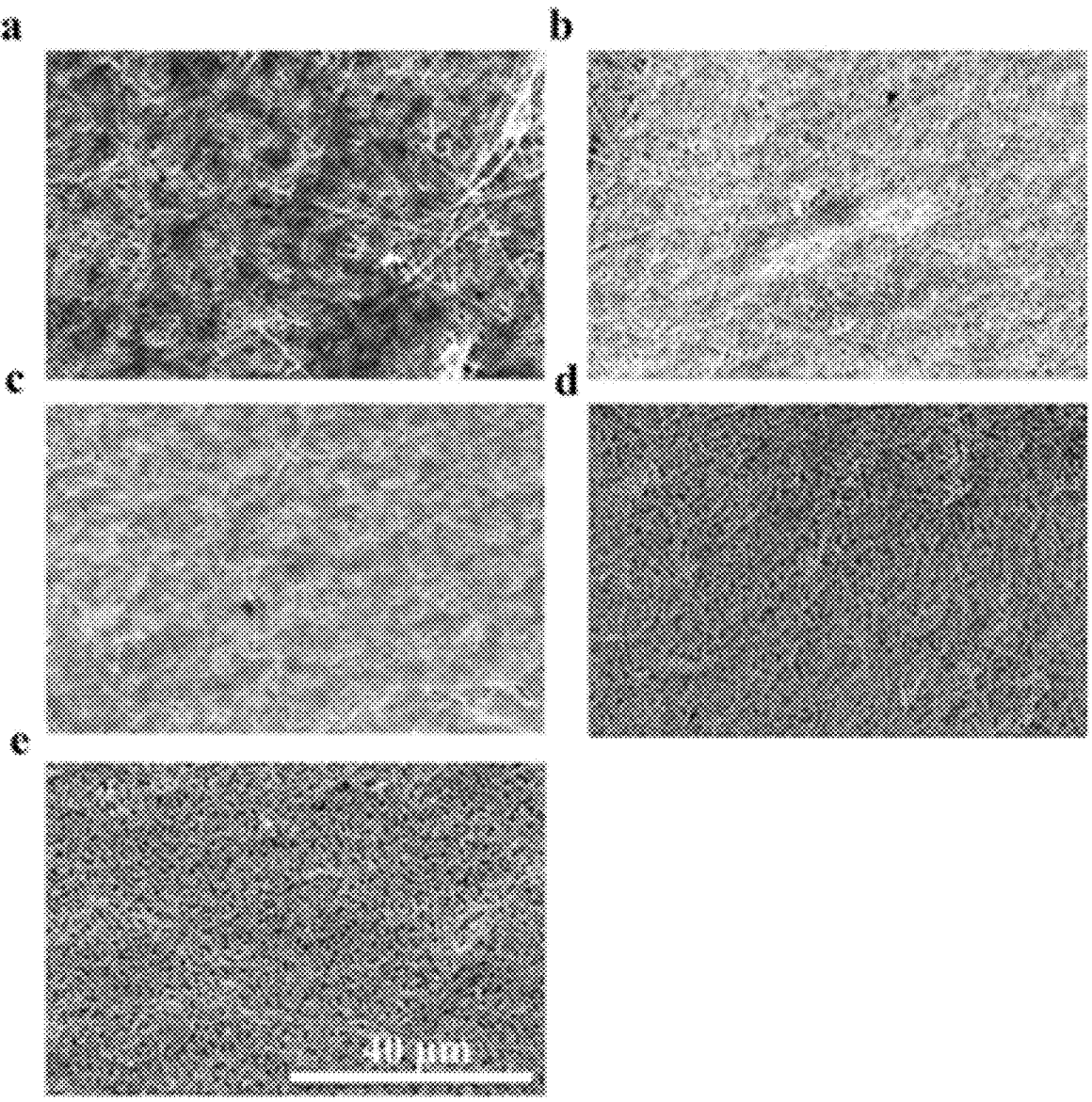
FIG. 10 shows (a) SEM image of Cu NWs film without calcination and pressing process; (b-e) SEM images of Cu NWs films calcined under the reducing atmosphere (5% Hz, 95% N₂) with the temperatures of 200, 300, 400, and 500° C. for 30 min, respectively; (e) Various annealing temperature versus electrical conductivity for different Cu NWs films, showing the 400° C. calcined sample displayed the highest conductivity. Thus, this temperature was adopted to do heat-treatment for other samples (Cu NWs and graphene-copper composites).
Figure 10:
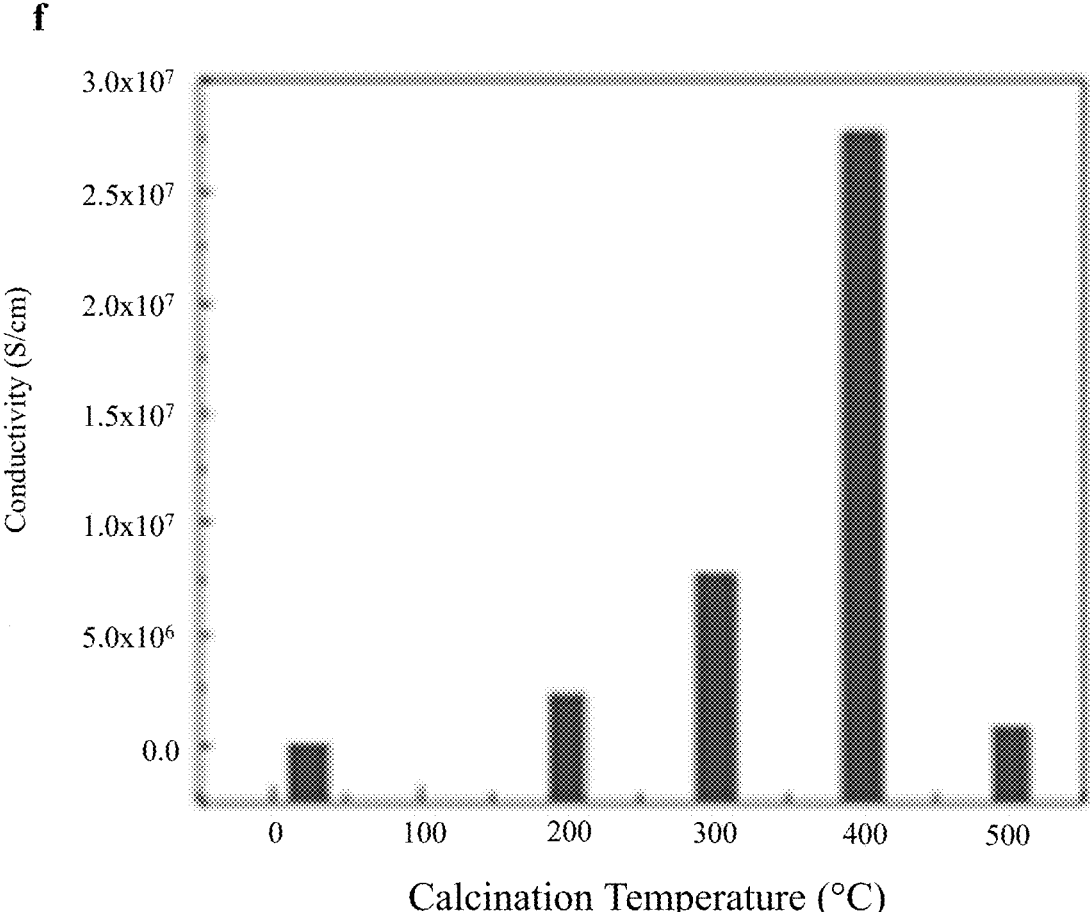
Figure 11:
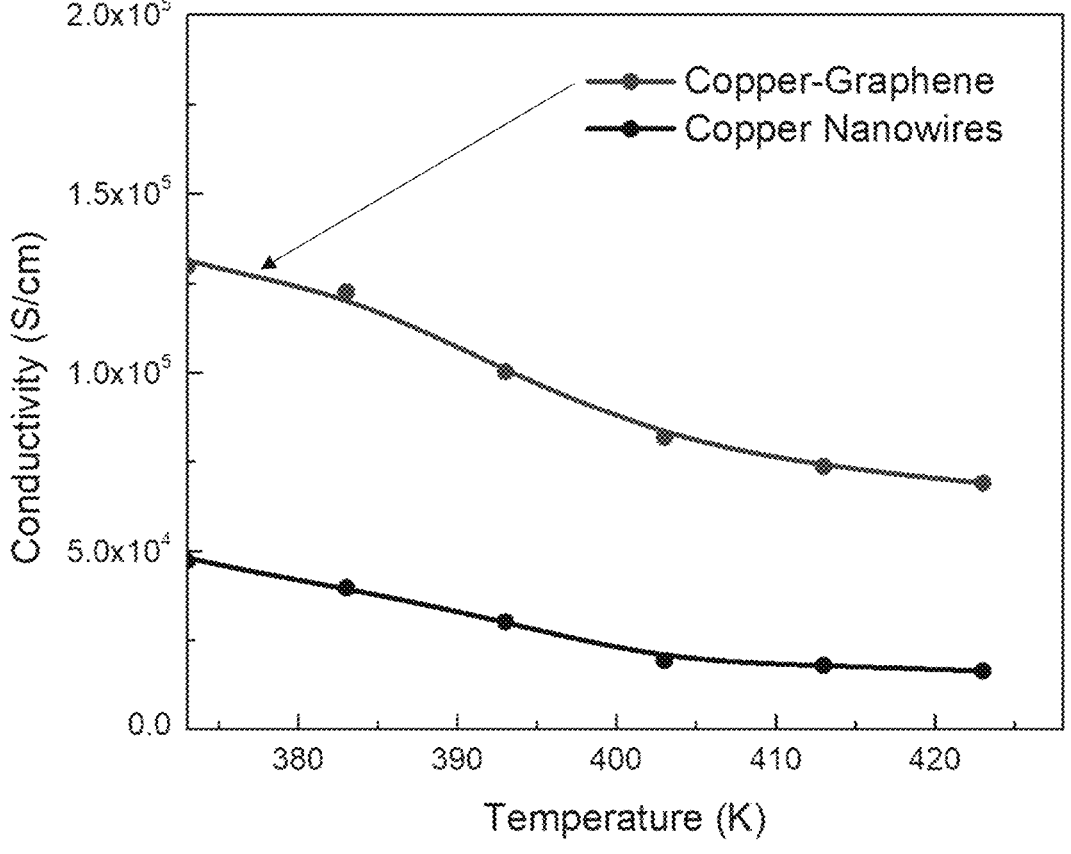
FIG. 11 shows variation of electrical conductivity with temperature from 373 to 423 K for Cu NWs and graphene-copper composite, showing the much higher conductivity of graphene-Cu composite compared with the pure Cu NWs.
Figure 12:
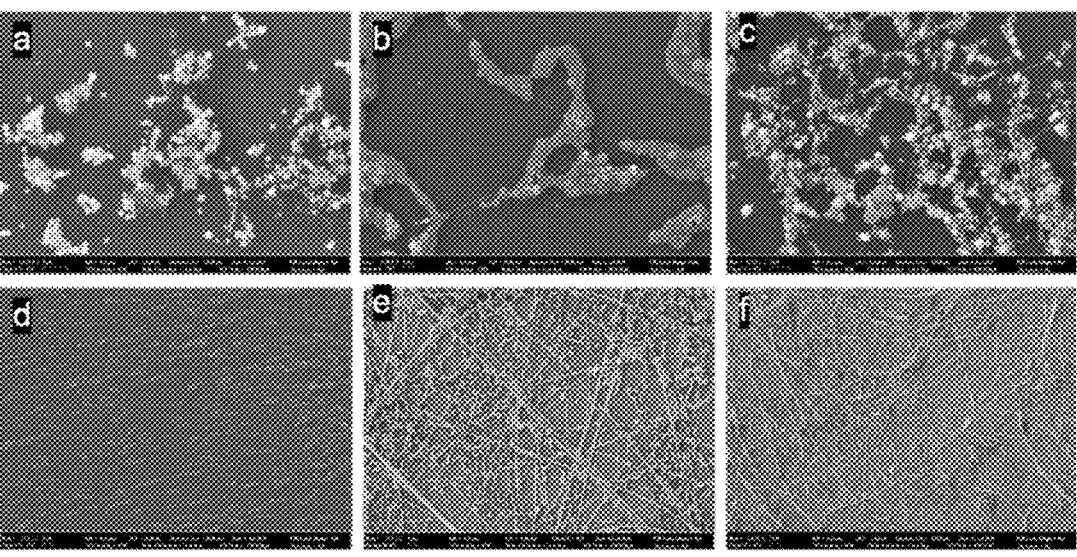
FIG. 12 shows (a-f) SEM image of a copper nanowire prepared in the hydrothermal reactor for different time (a. 2 hours, b. 4 hours, c. 6 hours, d. 9 hours, e. 10.5 hours, and f. 16 hours).
Figure 13:
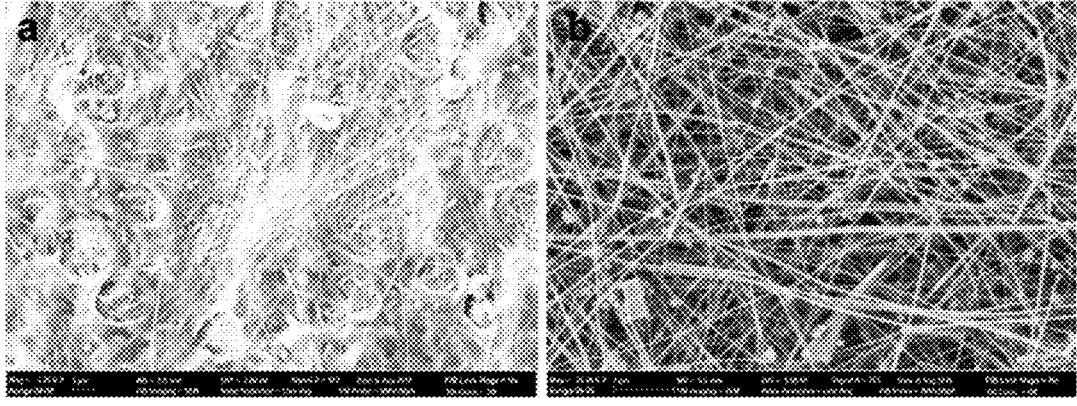
FIG. 13 shows a copper thin film conductor before (a) and after dodecanoic acid (ethanol) treatment (b).
Figure 14:
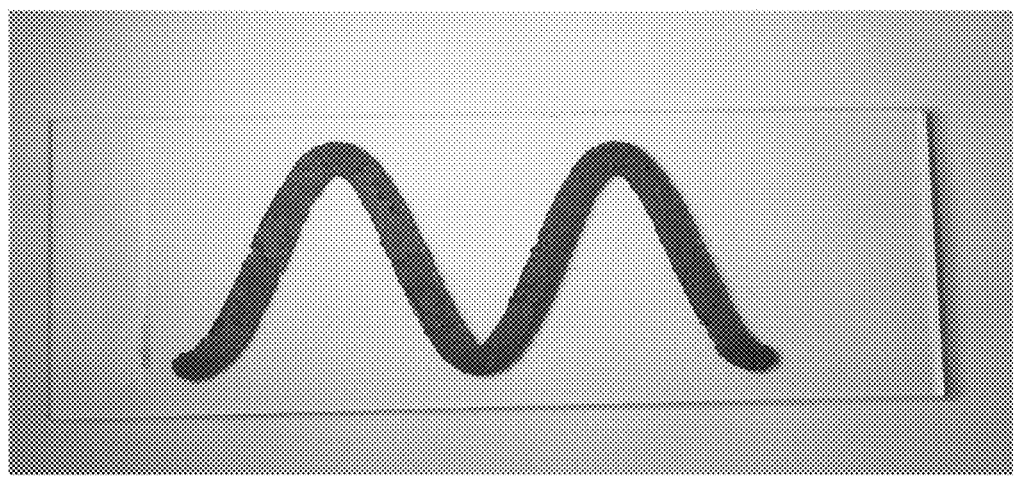
FIG. 14 shows a copper-nickel ink printed circuit by direct writing (printing).
Figure 15:
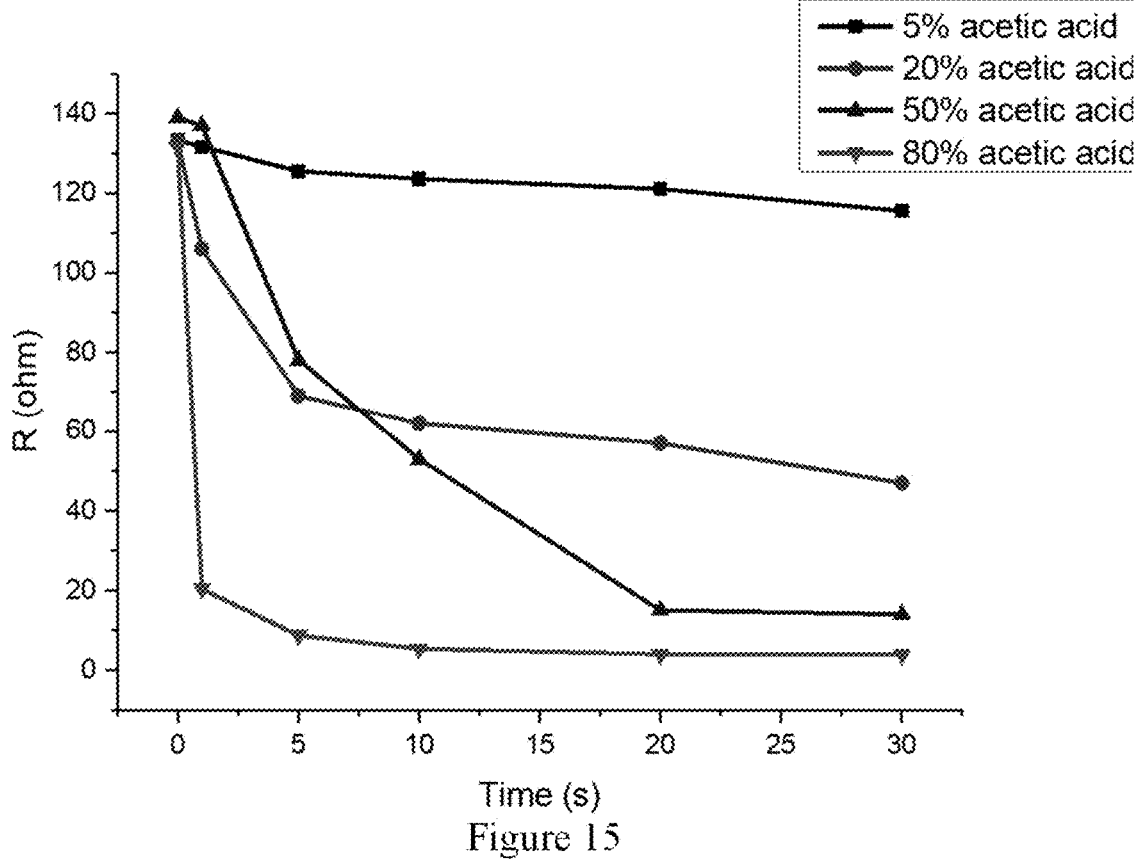
FIG. 15 shows the different concentration of acetic acid treatment time on the resistance of copper nanowire thin film with 2 μm thickness.
Figures 16, 17:
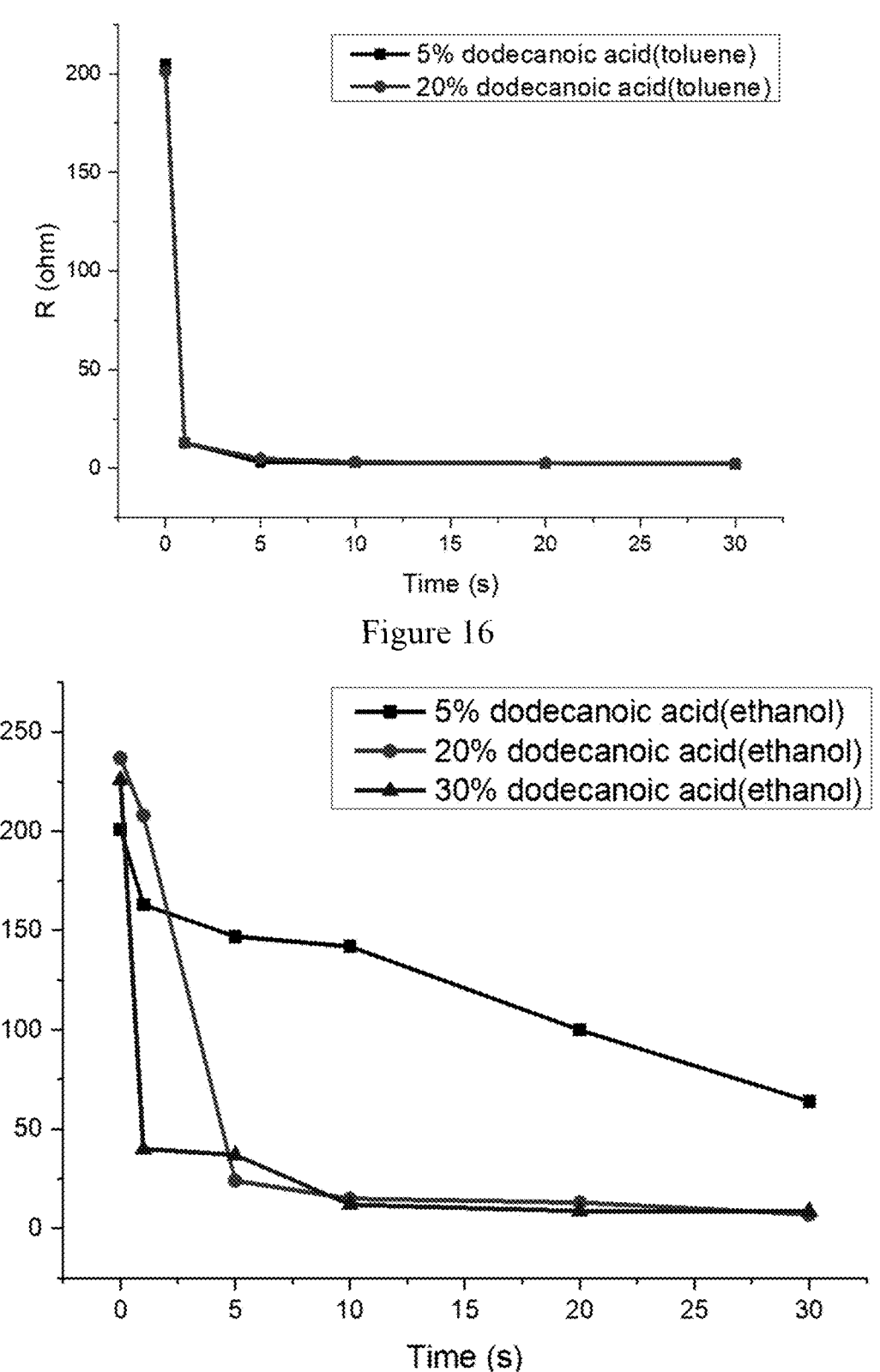
FIG. 16 shows the treatment time of dodecanoic acid (toluene) at different concentration on the resistance change of copper nanowire thin film with 2 μm thickness.
FIG. 17 shows the treatment time of dodecanoic acid (ethanol) at different concentration on the resistance change of copper nanowire thin film with 2 μm thickness.
Figure 18:
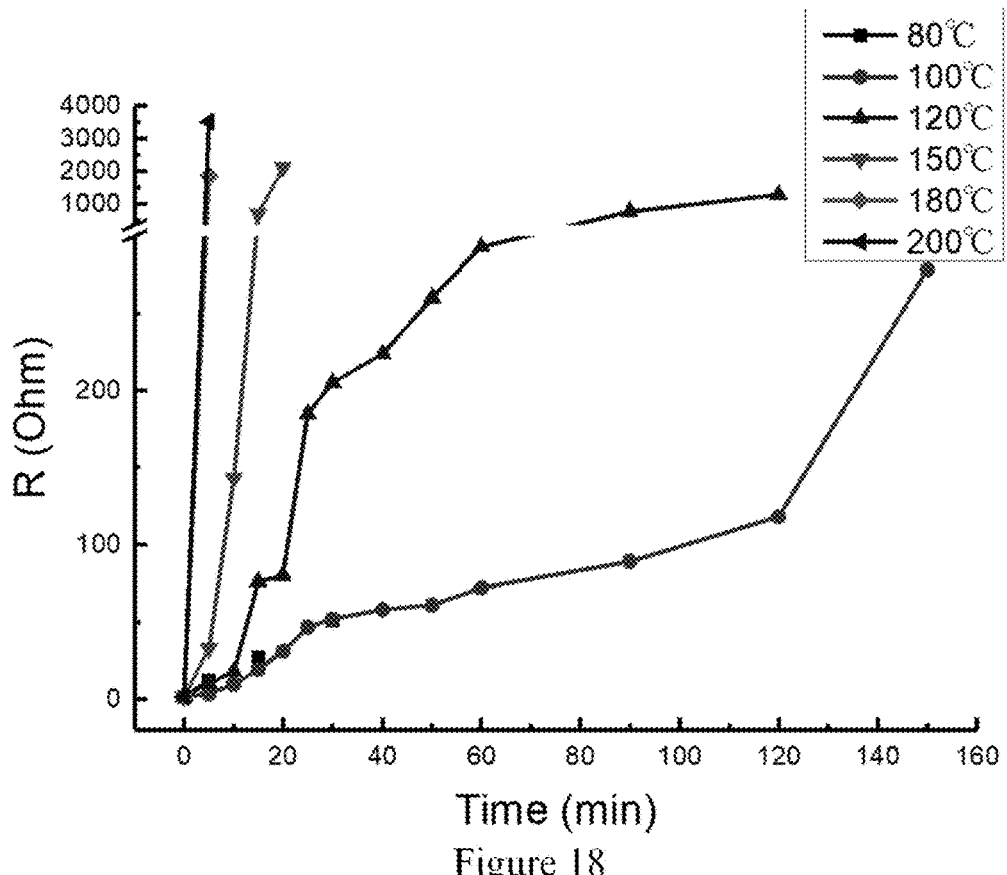
FIG. 18 shows the time dependent resistance of copper-nickel nanowire thin film with 4 μm thickness (high temperature accelerated oxidation testing).
Figure 19:
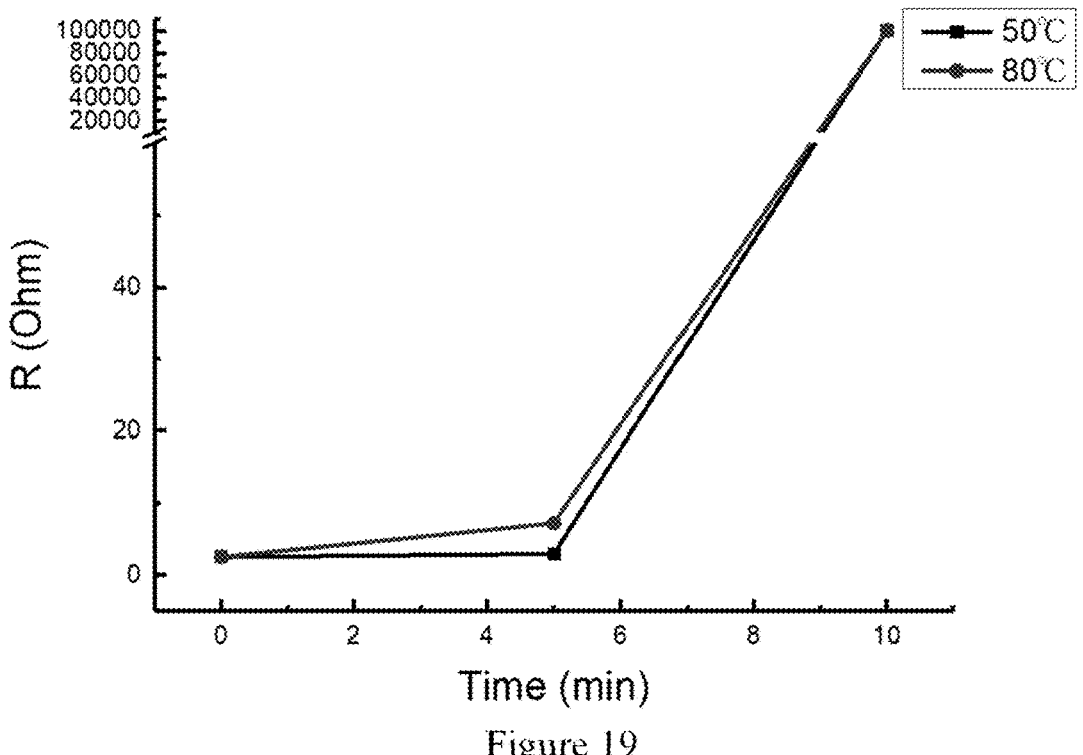
FIG. 19 shows the time dependent resistance of copper nanowire thin film with 4 μm thickness (high temperature accelerated oxidation testing).
Figure 20:
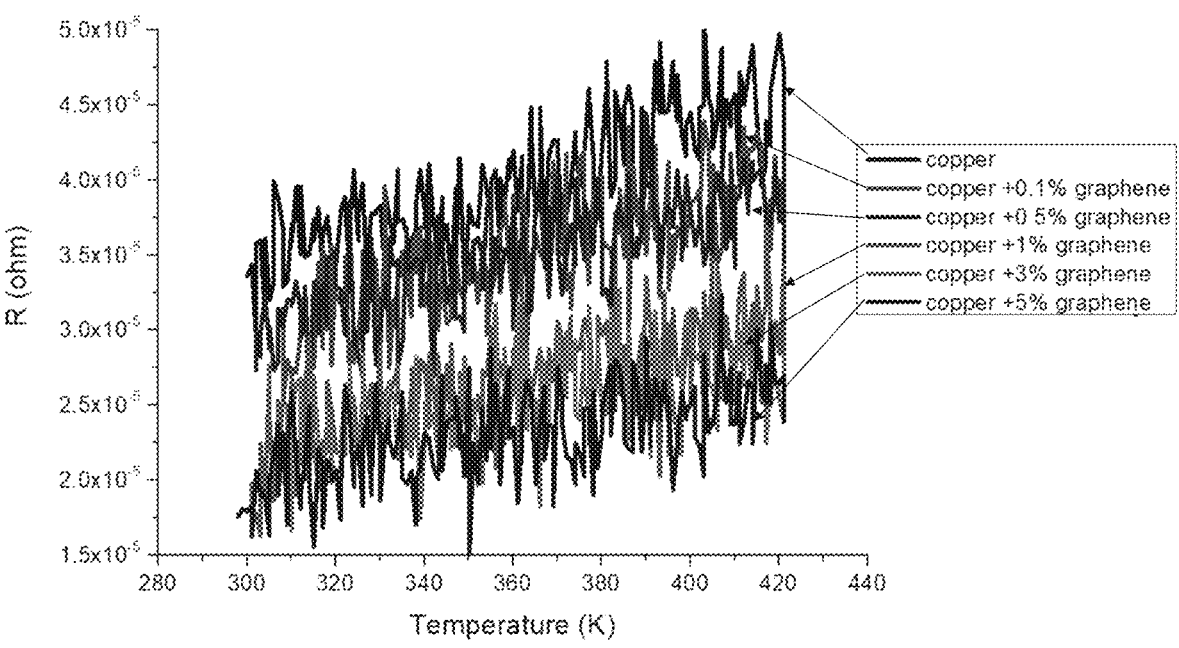
FIG. 20 shows the resistance-temperature curves of copper-graphene bulk conductor annealed at 500° C.
Figure 21:
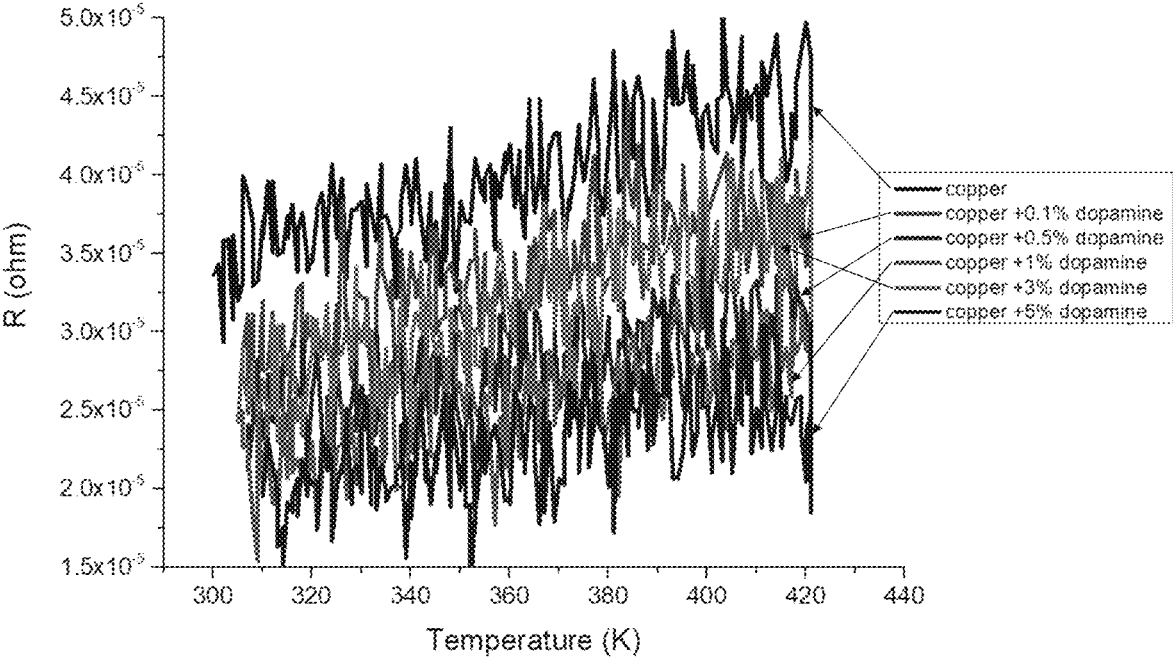
FIG. 21 shows the resistance-temperature curves of copper-graphene (derived from dopamine) annealed at 500° C.
Figure 22:
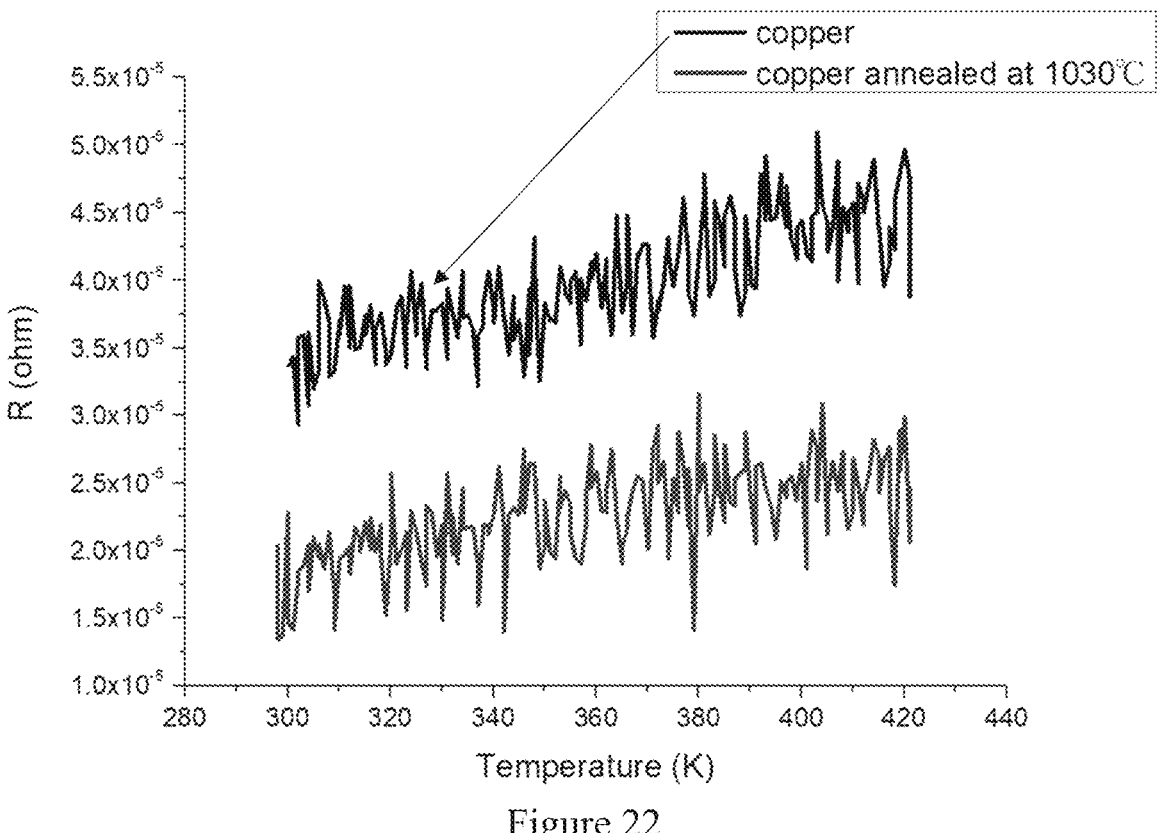
FIG. 22 shows the resistance-temperature curves of copper bulk conductor before and after annealing at 1030° C.

The electrical conductivity of the graphene-Cu composite is also important. The breakdown current and temperature dependent electrical conductivity of nanocomposite were analyzed using a four-point probe measurement scheme. The results showed a linear relative resistance change in both samples (FIG. 2a). An abrupt increase in electrical resistances indicated a breakdown current. FIG. 2a shows that the graphene-copper composite exhibited a larger breakdown current than that of the pure Cu NWs. The graphene-Cu composites sustained a 39% higher breakdown current than that of the pure Cu. This demonstrated that the graphene shell remarkably increased the ampacity of the Cu. Selected Cu NWs and graphene-Cu composite (FIG. 10) were characterized under the same testing conditions (293 K to 423 K). As indicated in FIG. 2c, the graphene-Cu composite exhibited a comparable electrical conductivity ($3.6\times10^5$ S cm$^{-1}$ at 293 K) to pure Cu ($5.3\times10^5$ S cm$^{-1}$) and three times greater electrical conductivity than pure graphene (~$10^2$S cm$^{-1}$). The presence of graphene enabled the composite to retain 89% of the room temperature conductivity at higher temperatures (363 K). In contrast, the pure copper only retained 34% of the electrical conductivity under the same conditions. As the temperature was increased to 423 K, the conductivity of the graphene-Cu composites was higher (4.3 times larger) than that of Cu (FIG. 11).

The SEM images before and after the high current carrying ampacity measurements showed that the graphene assisted the structural conservation of the graphene-Cu composites. FIG. 2b demonstrated that the graphene-Cu composite retained most of its wire-like structure after the high current carrying measurements, as opposed to the pure Cu film. This structural stability may help increase the lifetime and prolong the performance of micro-devices.

An important feature to be considered in micro-devices is the ability of their circuits to dissipate heat. Therefore, we analyzed the images captured by a thermal camera and thermo-electric graphs. The upper images of FIG. 2d showed the thermal images of graphene-Cu and Cu conductors on a heated plate with temperature of 363 K. We used a typical film coated with rectangular-shaped silver (Ag) electrodes for the four-point probe test, as shown in the inset of this image. We maintained both samples at thermal equilibrium before thermal imaging. For the graphene-Cu films, we observed that the silver area exhibited higher temperature than that of the rest, whereas the measured temperature for the graphene-Cu film area was around 318 K. In contrast, the Cu conductor showed a higher temperature than that of the rectangular Ag area. The high-emissivity and thermal radiation of graphene made the graphene-Cu appear cooler. This indicated that the graphene was beneficial to the phonon transmission. Furthermore, the graphene-Cu and Cu films were subjected to a high current density of 4 A. We observed that the graphene-Cu (~308 K) conductor exhibited a much lower temperature than that of the Cu conductor (~338 K) under the same current density (middle and lower images of FIG. 2d). To gain more insight into this difference, the temperature change of Cu and graphene-Cu versus time was plotted in FIG. 2e. As shown in the plot, a considerably faster rate of increase in temperature was seen in Cu than in the composite at 1 A. Moreover, at 4.5 A, the temperature of the pristine Cu reached ~347 K. However, under the same conditions, the composite reached 316 K (more than 30 K below that of the Cu). In addition, the thermal diffusion rate of the graphene-Cu and Cu films showed a similar trend. The graphene-Cu conductor showed a faster fall in the temperature (a large absolute value of $\Delta t/\Delta T$) when compared with the Cu conductor.

All of these results validated that the graphene-Cu composite conductor had a larger current carrying capability, higher electrical conductivity, higher thermal conductivity and better thermal dissipation in a broad temperature range than Cu.

Figure 3:
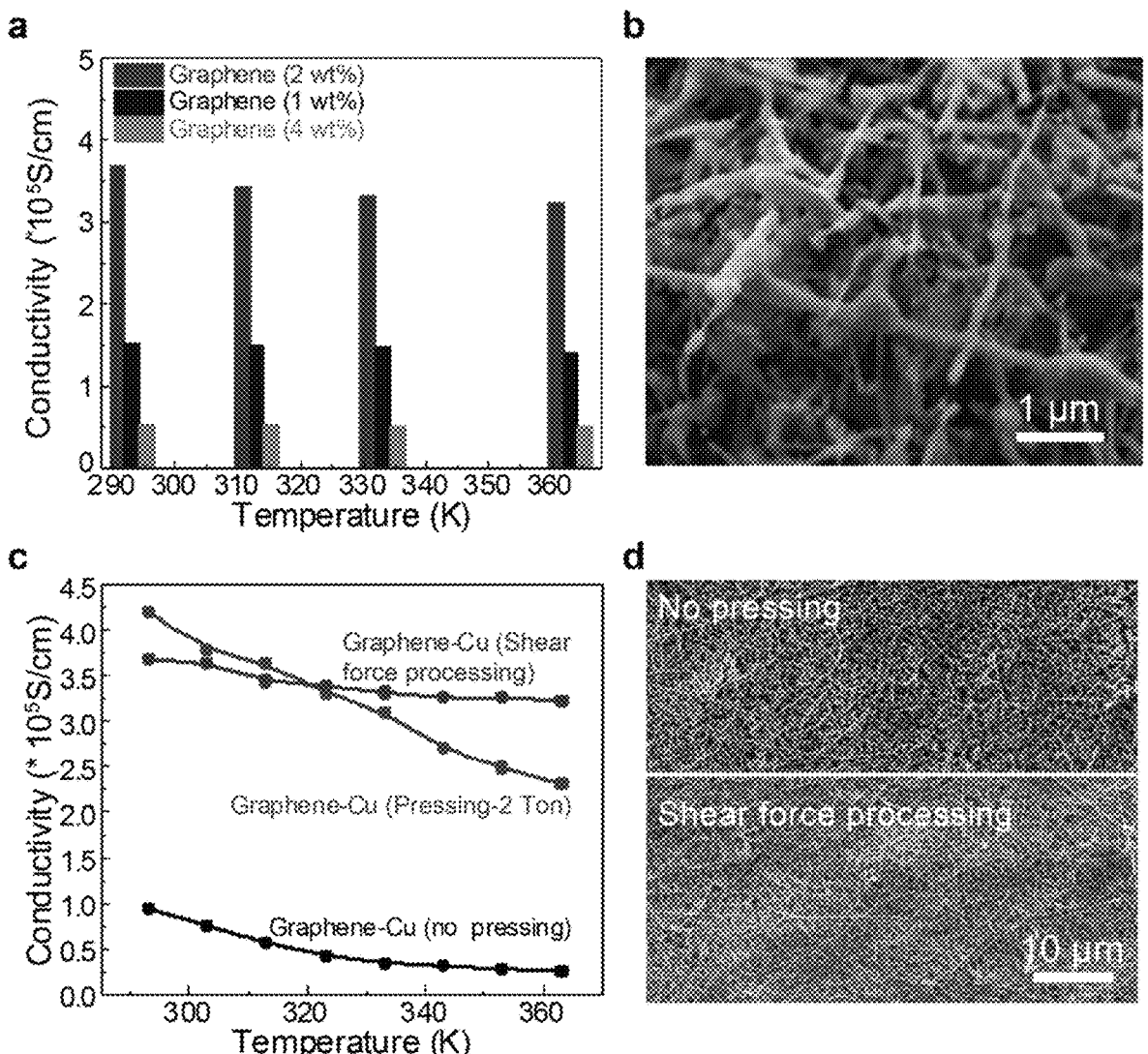
FIG. 3 shows the influence of various factors one the electrical conductivity of graphene-copper composite. (a) Graphene concentration versus electrical conductivity with temperature for different composites. The bars for each set from left to right are Graphene (2 wt %), Graphene (1 wt %), and Graphene (4 wt %). (b) SEM image of 2 wt % graphene-copper composite. (c) Temperature-dependent electrical conductivity for graphene-copper composites under different processing conditions. (d) SEM images of samples without pressing (upper) and with sheer force pressing process (lower).

Furthermore, we altered the wt % of graphene in the composite to investigate its effect on the temperature dependent conductivity. FIG. 3a shows that 2 wt % (the conductivity of $3.1 \times 10^5$ S cm$^{-1}$ at 363 K) was the optimum amount of graphene in the matrix to complement the temperature-dependent conductivity of the composite. A percolation network was created in the graphene-Cu composite (FIG. 3b). In comparison, Cu with 1 wt % of graphene exhibited a lower conductivity of $1.4 \times 10^5$ S cm$^{-1}$ at 363 K. After increasing the graphene to 4 wt %, an even lower initial conductivity of $0.52 \times 10^5$ S cm$^{-1}$ at 293 K was obtained. However, 4 wt % graphene had a better temperature stability ($0.5 \times 10^5$ S cm$^{-1}$ when measured at 363 K). We chose Cu composite with 2 wt % graphene as the prototypical example for the further studies.

Effect of Mechanical Pressing. Additionally, we analyzed the effect of mechanical pressing on the thermal conductivity of the 2 wt % graphene-Cu composite thin film. FIG. 3c showed the temperature-dependent conductivities of graphene-Cu composites under hydraulic uniaxial pressing and shear force pressing. 50 N of force was applied for 10 minutes at room temperature. In comparison to the unpressed films, the pressed ones exhibited much less porosity (FIG. 3d) and much higher conductivity (for pressing and shear forces samples: 4.42 and 3.86 times higher at 293 K)

under different temperatures. More importantly, the pressed films exhibited a higher conductivity ($4.2 \times 10^5$ S cm$^{-1}$) at 293 K. While still greater than the unpressed films, the conductivity decreased as the temperature increased over 333 K. Without intending to be bound by any particular theory, we believe that the sheer force that created an effective net-connection between the graphene-Cu wires. We propose that the electrons and phonons in the film became more readily transmitted, resulting in a higher conductivity at elevated temperatures, without intending to be bound by any particular theory. Especially for applications at a higher temperature, pressing of the graphene-Cu film is a preferred embodiment.

Figure 7:
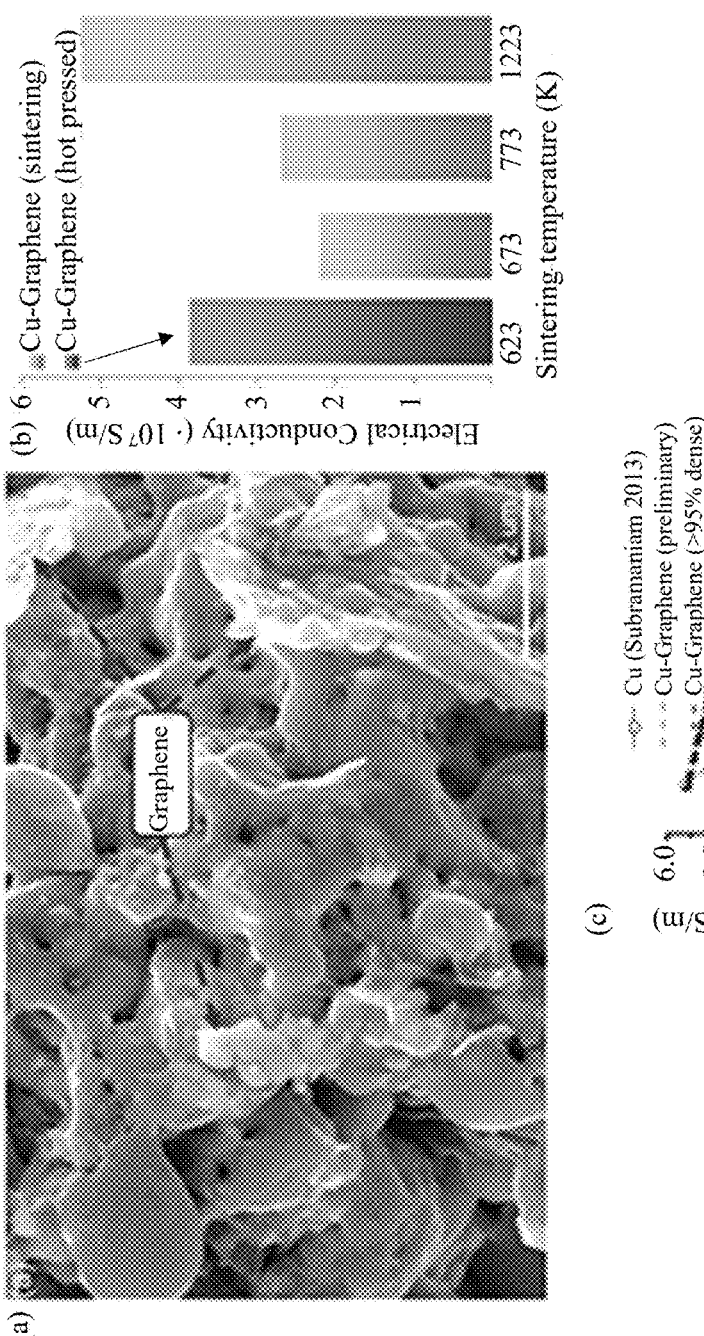
FIG. 7 shows preliminary result of Cu-G conductor. (a) Scanning electron microscopy (SEM) image of Cu-G conductor, (b and c) sintering and testing temperature dependent conductivity of Cu-G, as well as projected conductivity based on density.
Figure 7:
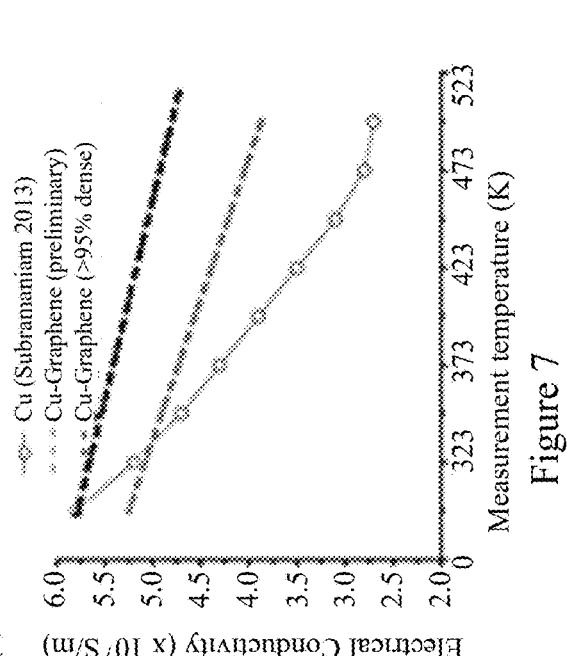

Our results for a ~82% dense graphene-Cu composite subjected to hot pressing were $52 \times 10^6$ S/m at 293 K and $48 \times 10^6$ S/m at 373 K (FIG. 7b). For a nearly 100% dense sample with similar behavior in temperature dependence, electrical conductivity of graphene-Cu is projected to be $55 \times 10^6$ S/m at 423 K (the electrical conductivity of pure Cu conductor is $35 \times 10^6$ S/m at 423 K), as projected in FIG. 7c.

The continuous shear deformation results in a fully dense anisotropic structure at room temperature. Without intending to be bound by any particular theory, the shear force during the extrusion facilitates the graphene alignment in Cu matrix to enhance axial current conductivity and circumferential thermal conductivity due to 2D nature of graphene. The scalable and oxidation-resistant graphene, which is a 2D carbon monocrystal with a lateral size extending from microns to millimeters (far larger than other carbon allotropes), eliminates grain boundaries in the lateral direction to the utmost extent. Without intending to be bound by any particular theory, the nanostructured Cu interacting with a graphene nanosheet will adopt the atomic spacing of the graphene and will be slightly distorted with (111)-rich crystalline configuration due to the lattice-match effect, which would lead to lower resistance and Joule heating. These composite materials can achieve orders of magnitude enhancements in electric and thermal conductivities, as well as ampacity, in comparison to existing current-carrying metal conductors.

Figure 4:
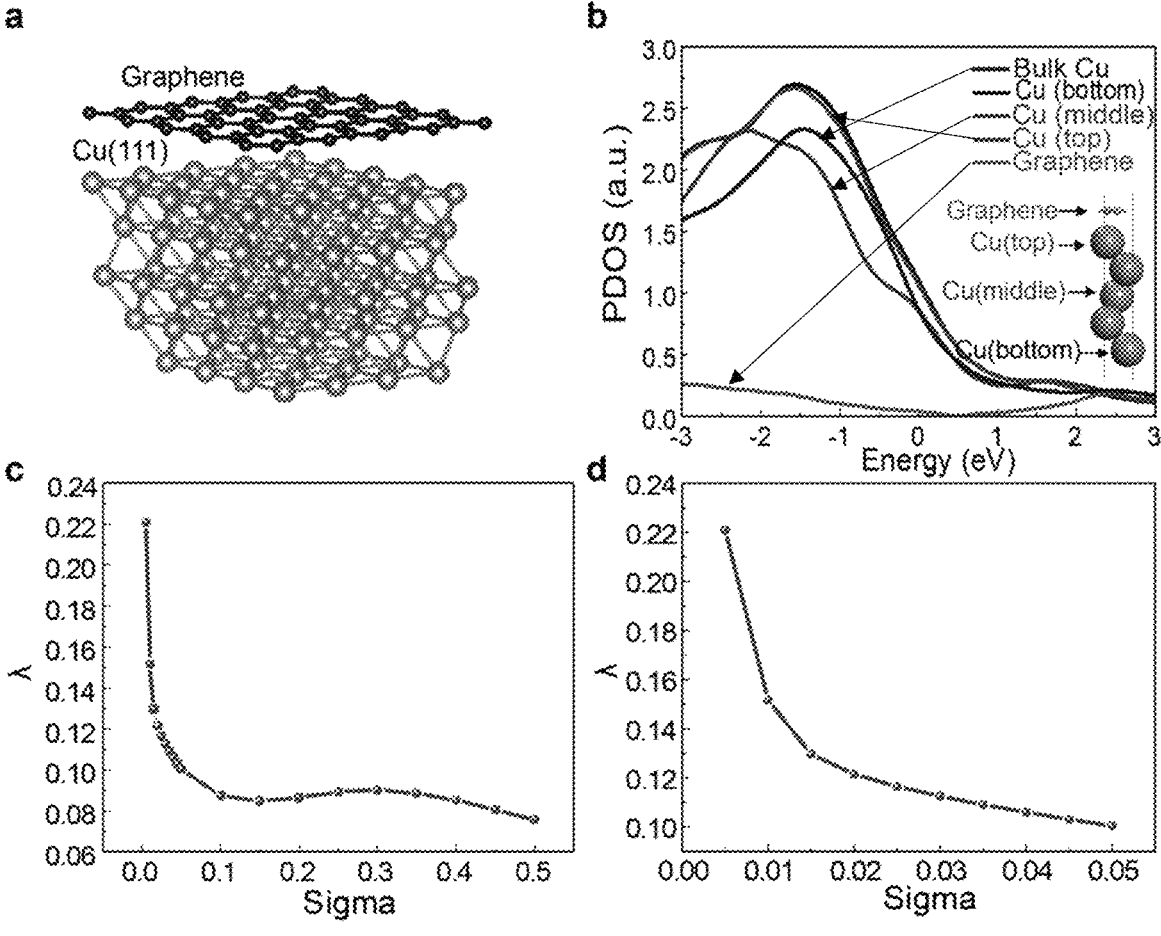
FIG. 4 shows mechanistic analysis. (a) Schematic modeling structure of graphene on top of Cu (111) surface. (b) The projected density of states (PDOS) of graphene on top of Cu (111) surface includes five layers of Cu atoms, one layer of graphene and a vacuum with a thickness of 15 Å. (c-d) Electron-phonon coupling of graphene-copper composite, which is calculated based on the density functional perturbation theory (DFPT).

Carrier Transport Behavior. To assess the carrier transport behavior of graphene-Cu composites and its differences from Cu systems, first-principles calculations were carried out with the plane-wave implementation of the Perdew-Burke-Ernzerhof generalized gradient approximation (PBE) to density functional theory as implemented in the Quantum Espresso code. For the case of graphene-Cu, a non-local correlation functional (vdW-DF) was included for the long-range van der Waals interaction, which gave a similar distance between graphene and the Cu surface as compared with literature. The periodic slab model of graphene on top of Cu(111) surface included five layers of Cu atoms, one layer of graphene and the vacuum with a thickness of 15 Å (FIG. 4a). The structures were optimized until the forces on the atoms were less than 0.005 eV/° A and the stress was less than 0.01 kbar. Electron-phonon coupling was calculated based on the density functional perturbation theory (DFPT). Our computed electron-phonon coupling constant for Cu was $\lambda=0.158$, which was close to previous results. As shown in FIG. 4b, for the graphene-Cu interface system, the density of states of surface Cu atoms at the Fermi level was effectively increased, which indicated the significance of electronic structure engineering of graphene-Cu composite systems. More importantly, our computational results (FIGS. 4c-4d) showed that the electron-phonon coupling constant for the graphene-Cu interface system was close to 0.085. This value was much smaller than that for the Cu system. The reduced electron-phonon coupling strength of the composite system was consistent with the improvement in electrical conductivity at high temperature. Compared with Cu, the interaction between electrons and phonons was effectively decreased in the composite system due to the incorporation of graphene. Therefore, it was less probable for those charge carriers to be subjected to electron-phonon scattering even if more phonon modes were activated by temperature increases.

Figure 5:
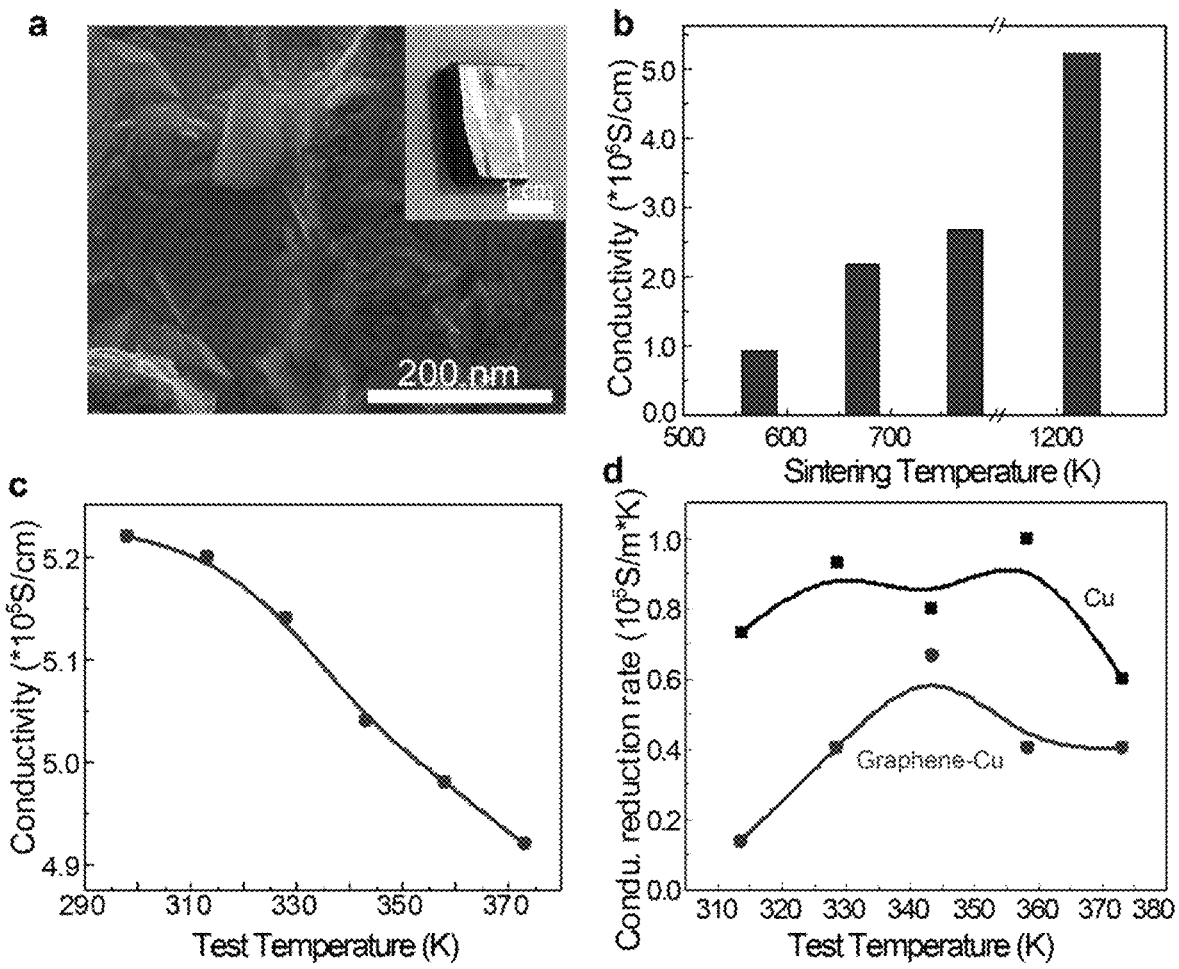
FIG. 5 shows electrical conductivity of bulk graphene-copper composite. (a) SEM image and photo of the as-synthesized graphene-copper composite. (b) Electrical conductivity with different sintering temperatures for bulk graphene-copper composite. (c) Temperature versus electrical conductivity graphene-copper composite. (d) Electrical conductivity reduction rates of as-synthesized graphene-copper composite and commercial copper.

Use in Bulk. To investigate the feasibility of the graphene inclusion strategy in practice for metal conductors, a series of high-density graphene-Cu NW composites were prepared in bulk (FIG. 5a). FIG. 5b shows that the sintering temperature plays an important role for improving the conductivity of graphene-copper composite. In particular, the figure shows that the graphene-Cu NW composite conductors delivered increased electrical conductivity with increasing sintering temperature. It shows a conductivity of $5.2 \times 10^5$ S $cm^{-1}$ at room temperature for an optimum sintering temperature of 1223 K. Furthermore, with increasing temperature, no apparent conductivity decrease was observed. At 373 K, we observed a conductivity of $4.9 \times 10^5$ S $cm^{-1}$ (94% of the conductivity at 293 K (FIG. 5c)). The electric conductivity reduction rates of the bulk composite graphene-Cu NW were much lower than that of bulk Cu (FIG. 5d, $\Delta\sigma/\Delta T$). The results indicate the feasibility of the graphene inclusion in bulk. Alternatively, Cu powder could be used with graphene in bulk.

Methods. Materials. Copper nanowires were synthesized in a Schlenk-line using a modified method in the literature. The synthesized copper nanowires were dispersed in a toluene solution. Liquid-phase graphene nanosheets were synthesized using a common exfoliation method. All chemicals were purchased from Sigma-Aldrich and used as received.

Fabrication of graphene-copper conductor. Graphene nanosheets solution (1 mg/mL, 0.66 mL) was diluted in 25 mL of methanol. To this diluted graphene solution, Cu NWs toluene solution (11 mg/mL, 3 mL) was added under ultrasonic condition. Then, the mixture was ultrasonicated for more 10 min to form the graphene-copper composite. The product was separated and the pellet was collected by centrifugation at 5500 rpm for 5 min. Then, the obtained sample was washed three times with toluene and dispersed in 2.5 mL of toluene. To obtain the consolidated graphene-Cu film with a well-percolated conductive network, the ink solution was drop-casted on a substrate with preferential flow followed by rolling pressed through a sheer force process (shear force assisted rolling consolidation (FIG. 1b)). Finally, the as-synthesized composite film was calcined at 673 K for 30 min in an atmosphere of 5% $H_2$ balanced by $N_2$ to obtain the final graphene-copper conductor.

In an alternative procedure, the shear force assisted rolling consolidation and calcination was replaced by hot pressing. The hot pressing occurred at a temperature of about 500° C.

Figure 6:
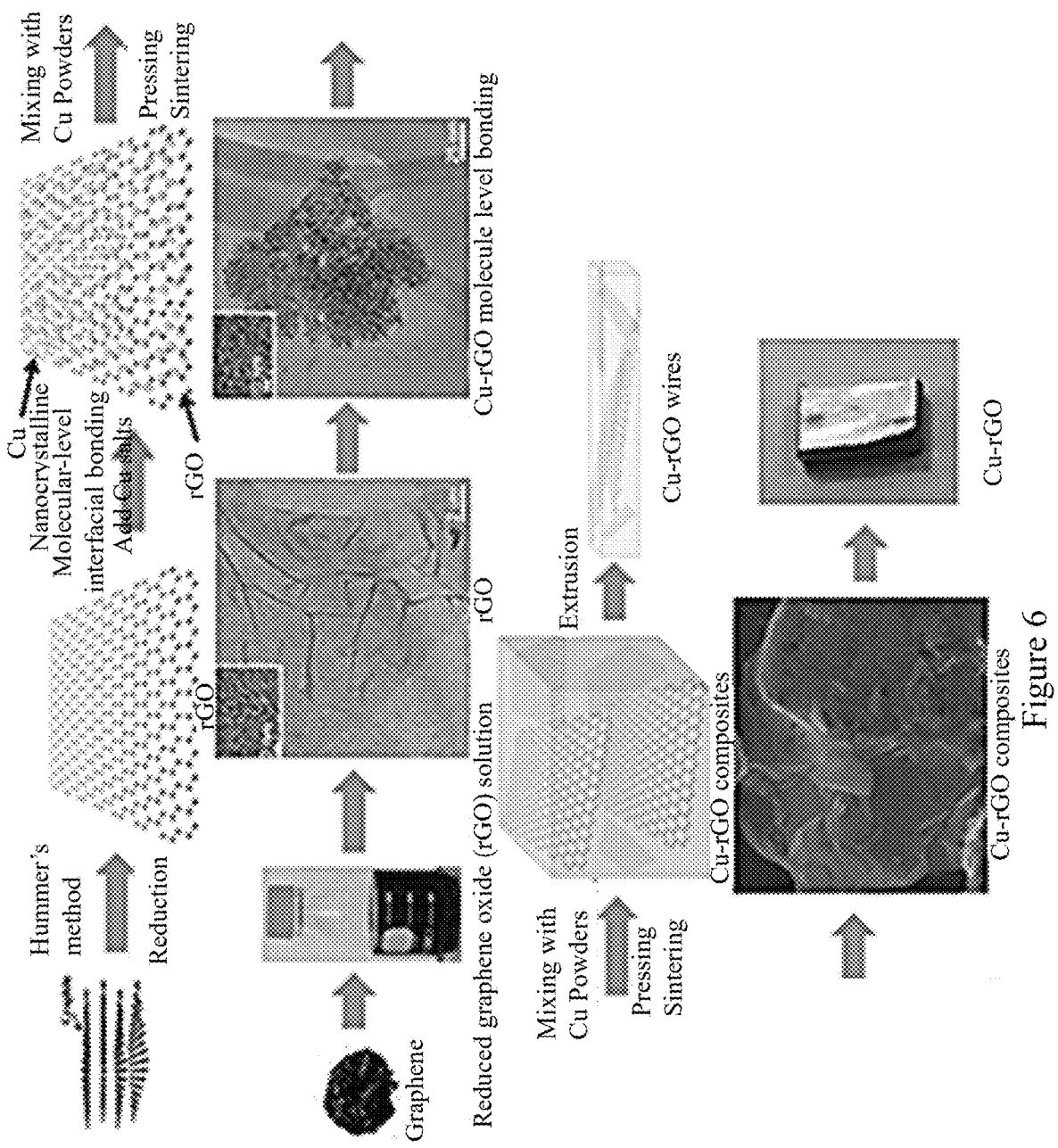
FIG. 6 shows schematics showing the cost-effective manufacturing process of high temperature (hot pressing) metal/rGO composites for high performance conductors.

For the bulk graphene-copper sample in FIG. 6, commercial copper powder (Alfa Aesar, −325 mesh, 99%) was mixed with reduced oxide graphene (~2 wt %) obtained using a modified Hummer's method. Then, the as-synthesized composites were thermally sintered at 300, 400, 450 and 500° C.

Characterization. The morphologies of the obtained samples were studied by scanning electron microscopy (SEM, FEI Quanta 450) and transmission electron microscope (TEM, JEOL JEM-1400). The structural properties were determined by energy dispersive spectroscopy (FEI Quanta 450) and X-ray diffraction (Bruker D8 Discover).

The Young's modulus and hardness of the films were determined using a nanoindenter (Hysitron Com. TI 980 TriboIndenter). The Young's modulus and hardness values could be determined by fitting the experimental curves through the nanoindenter software. The electrical conductivity measurements were carried out using a four-probe conductivity meter (Keithley 2400) and the thermal image was taken by an IR camera (FLIR).

Electron-phonon coupling calculation. First-principles calculations were performed within the plane-wave implementation of the Perdew-Burke-Ernzerhof generalized gradient approximation (PBE) to density functional theory as implemented in the Quantum Espresso code. The wavefunction and charge cutoff energies are taken as 30 Ry and 120 Ry, respectively. Norm-conserving pseudopotential was used in these calculations. The $21 \times 21 \times 21$ and $21 \times 21 \times 1$ Γ-centered k-point meshes are used for the calculations of Cu, and the slab model of graphene on Cu (111) surface, respectively.

EXAMPLE 2

This example provides a description of metal nanocomposites of the present disclosure, processes of making same, and characterization of same.

Copper-Based Nanowire Ink Feedstock Preparation:

1) Copper nanowire preparation: 2.4 g copper chloride, 3.9 g D-glucose and 14.55 g hexadecylamine (HDA) added into 900 mL DI water, then stirring 12 h to achieve an uniform emulsion. The above solution is then heated in the hydrothermal reactor for different time (6 hours, 9 hours, 9.5 hours, 10 hours, 12 hours, and 15 hours). The resulted copper nanowire solution is then collected for the ink preparation.

2) Copper-graphene feedstock preparation: The copper nanowires are washed by the dodecanoic acid (diluted with the ethanol solvent) to remove the HDA ligands. Then, the samples add different weight concentrations of either the exfoliated graphene (0.1 wt %, 0.5 wt %, 1 wt %, 3 wt %, 5 wt %) or mixed with dopamine (0.1 wt %, 0.5 wt %, 1 wt %, 3 wt %, 5 wt %). After mixing, the powder is then uniformly blended by Thinky mixer to prepare the copper-graphene or copper-dopamine ink solution.

3) Copper-nickel nanowire preparation: Different amounts of copper chloride and nickel chloride (such as, 2.16 g copper chloride and 0.182 g nickel chloride; 1.92 g copper chloride and 0.364 g nickel chloride; 1.68 g copper chloride and 0.546 g nickel chloride; 1.2 g copper chloride and 0.950 g nickel chloride;), 3.9 g D-glucose and 14.55 g hexadecylamine are added into 900 mL DI water, then stirring 12 h to get an uniform emulsion. The above solution is heated in the hydrothermal reactor for different reaction time (9 hours, 9.5 hours, and 10 hours).

Copper-Based Conductor Preparation:

1) Printable copper thin film conductor: The copper-based ink solution (copper, copper-graphene, or copper-nickel) can be deposited onto the flexible substrates through a variety of coating techniques (spin coating, dip coating, screen printing, ink jet, and direct writing based additive manufacturing) at room temperature. Then, the thin film conductor can be dipped into 20 wt % dodecanoic acid and ethanol solution within 30 s to significantly improve electric conductivity by removing the non-conductive additives.

2) Copper based bulk conductor: The dried copper-based powder (copper, copper-graphene, copper-dopamine, or copper-nickel) is heated in the forming gas at 500° C. for 300 minutes to remove organic residues in the ink feedstock.

They were then grinded and pressed into a bulk pellet conductor using hydrostatic press. The bulk conductor was then heated at 1030° C. for 10 min in the forming gas.

FIGS. 12-22 show various characterizations of nanocomposite materials made by methods of this example.

Although the present disclosure has been described with respect to one or more particular embodiments and/or examples, it will be understood that other embodiments and/or examples of the present disclosure may be made without departing from the scope of the present disclosure.

The invention claimed is:

1. A process of making a graphene material-metal nanocomposite comprising:

forming a layer of graphene material and/or graphene-precursor material on at least a portion of a surface of or all of the surfaces of metal nanowires, comprising forming a dispersion of a metal powder or a metal precursor and a graphene material and/or graphene-precursor material, wherein the forming the dispersion comprises:

dispersing the metal powder or the metal precursor in a first dispersant, and dispersing the graphene material and/or graphene-precursor material in a second dispersant, adding the metal precursor dispersion to the graphene material or graphene-precursor material dispersion; and aligning the metal nanowires via hot pressing, wherein the aligning is performed at a temperature of about 300° C. to about 1000° C. and/or the aligning is when 80% or more of a dimension of individual metal cores in the nanocomposite are within 5 degrees or less of a dimension of the aligned nanocomposite; and optionally, calcining the metal nanowires comprising a layer of graphene-precursor material, wherein the graphene material-metal nanocomposite is formed.

2. The process of claim 1, wherein the forming a layer of graphene material and/or graphene-precursor material on at least a portion of a surface of or all of the surfaces of metal nanowires comprises:

forming a dispersion of metal nanowires and the graphene material and/or graphene-precursor material, wherein the forming a dispersion of metal nanowires and the graphene material and/or graphene-precursor material comprises:

dispersing metal nanowires in a dispersant; and dispersing graphene material or graphene-precursor material in a dispersant, and adding the metal nanowire dispersion to the graphene material or graphene-precursor material dispersion, and the metal nanowires are present at 95 to 99 wt. % (based on the total weight of metal nanowires and graphene material and/or graphene-precursor material) in the dispersion and the graphene material or graphene-precursor material is present at 1 to 5 wt. % (based on the total weight of metal nanowires and graphene material and/or graphene-precursor material) in the dispersion, wherein the dispersant of the dispersion is water, a $C_1$ to $C_6$ alcohol, or a combination thereof and the metal nanowires are chosen from copper nanowires, aluminum nanowires, copper alloy wires, and combinations thereof.

3. The process of claim 1, wherein the dispersion further comprises one or more water-soluble primary amine; the metal powder is copper powder, aluminum powder, a copper alloy powder, or a combination thereof and the metal precursor is an aluminum precursor powder or a copper precursor powder, and, optionally, one or more powders chosen from nickel precursor powders, manganese precursor powders, zinc precursor powders, and combinations thereof; and the metal powder or metal precursor is present at 95 to 99 wt. % (based on the total weight of metal powder or a metal precursor and graphene material) in the dispersion and the graphene material is present at 1 to 5 wt. % (based on the total weight of metal powder or a metal precursor and graphene material) in the dispersion and the first dispersant and second dispersant are independently water, a $C_1$ to $C_6$ alcohol, or a combination thereof.

4. The process of claim 1, further comprising isolating the nanocomposite.

5. The process of claim 1, wherein the graphene material is graphene, reduced graphene, graphene oxide, exfoliated graphene sheets, exfoliated reduced graphene sheets, or exfoliated graphene oxide sheets, or a combination thereof.

6. The process of claim 1, wherein the graphene-precursor material is a molecule.

7. The process of claim 1, further comprising forming an ink comprising the nanocomposite, and, optionally, forming a film from the ink.

8. The process of claim 1, further comprising calcining the nanocomposite, wherein the calcining is performed out at a temperature of 625 to 1110 K.

9. The process of claim 1, further comprising forming a pellet comprising the nanocomposite, forming a wire from the pellet, and the forming the wire comprises extruding the pellet.

10. A process of making a graphene material-metal nanocomposite comprising:

forming a layer of graphene material and/or graphene-precursor material on at least a portion of a surface of or all of the surfaces of metal nanowires; and aligning the metal nanowires via hot pressing, wherein the aligning is performed at a temperature of about 300° C. to about 1000° C. and/or the aligning is when 80% or more of a dimension of individual metal cores in the nanocomposite are within 5 degrees or less of a dimension of the aligned nanocomposite; and optionally, calcining the metal nanowires comprising a layer of graphene-precursor material, wherein the graphene material-metal nanocomposite is formed.

* * * * *